US011430448B2

(12) United States Patent
Roh et al.

(10) Patent No.: US 11,430,448 B2
(45) Date of Patent: Aug. 30, 2022

(54) APPARATUS FOR CLASSIFYING SPEAKERS USING A FEATURE MAP AND METHOD FOR OPERATING THE SAME

(71) Applicant: Samsung Electronics Co., Ltd., Suwon-si (KR)

(72) Inventors: Jaeyoung Roh, Suwon-si (KR); Keunseok Cho, Suwon-si (KR); Jiwon Hyung, Suwon-si (KR); Donghan Jang, Suwon-si (KR); Jaewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 16/692,696

(22) Filed: Nov. 22, 2019

(65) Prior Publication Data
US 2020/0168230 A1    May 28, 2020

(30) Foreign Application Priority Data

Nov. 22, 2018    (KR) .................. 10-2018-0145644

(51) Int. Cl.
*G10L 17/00*    (2013.01)
*G10L 17/18*    (2013.01)
*G10L 15/02*    (2006.01)
*G10L 17/26*    (2013.01)
*G10L 17/04*    (2013.01)

(52) U.S. Cl.
CPC .............. *G10L 17/00* (2013.01); *G10L 15/02* (2013.01); *G10L 17/04* (2013.01); *G10L 17/18* (2013.01); *G10L 17/26* (2013.01)

(58) Field of Classification Search
CPC ........................................................ G16H 50/30
USPC .................................. 704/231–257, 270–275
See application file for complete search history.

(56) References Cited

U.S. PATENT DOCUMENTS

| 6,424,946 | B1 | 7/2002 | Tritschler et al. |
| 7,171,360 | B2 | 1/2007 | Huang et al. |
| 8,209,174 | B2 * | 6/2012 | Al-Telmissani ........ G10L 17/06 704/246 |
| 9,406,295 | B2 | 8/2016 | Huang |

(Continued)

FOREIGN PATENT DOCUMENTS

| JP | 2018-010110 A | 1/2018 |
| WO | 2018/201688 A1 | 11/2018 |

OTHER PUBLICATIONS

Wang et al. "Phoneme-Specific Speech Seperation". ICASSP 2016, pp. 146-150 (Year: 2016).*

(Continued)

*Primary Examiner* — Jesse S Pullias
(74) *Attorney, Agent, or Firm* — Jefferson IP Law, LLP

(57) ABSTRACT

A method and apparatus for processing voice data of a speech received from a speaker are provided. The method includes extracting a speaker feature vector from the voice data of the speech received from a speaker, generating a speaker feature map by positioning the extracted speaker feature vector at a specific position on a multi-dimensional vector space, forming a plurality of clusters indicating features of voices of a plurality of speakers by grouping at least one speaker feature vector positioned on the speaker feature map, and classifying the plurality of speakers according to the plurality of clusters.

20 Claims, 27 Drawing Sheets

① INPUT SPEECH          ② FORM CLUSTER ON SPEAKER FEATURE MAP          ③ CLASSIFY SPEAKERS

(56) References Cited

U.S. PATENT DOCUMENTS

| | | | |
|---|---|---|---|
| 9,792,900 B1* | 10/2017 | Kaskari | G10L 15/20 |
| 2004/0260550 A1 | 12/2004 | Burges et al. | |
| 2005/0182626 A1* | 8/2005 | Kim | G10L 15/07 704/245 |
| 2009/0319269 A1* | 12/2009 | Aronowitz | G10L 17/00 704/243 |
| 2012/0271632 A1* | 10/2012 | Do | G10L 17/02 704/246 |
| 2015/0371639 A1* | 12/2015 | Foerster | G10L 17/06 704/233 |
| 2016/0180852 A1* | 6/2016 | Huang | G10L 17/00 704/246 |
| 2017/0053644 A1 | 2/2017 | Rennie et al. | |
| 2018/0039888 A1* | 2/2018 | Ge | G06N 3/084 |
| 2018/0131692 A1* | 5/2018 | Katz-Oz | H04W 12/065 |
| 2019/0124441 A1* | 4/2019 | Dong | H04R 1/08 |

OTHER PUBLICATIONS

Haytham Fayek "Speech Processing for Machine Learning: Filter banks, Mel-Frequency Cepstral Coefficients (MFCCs) and What's In-Between" Apr. 21, 2016 Blog Post retrieved from "https://haythamfayek.com/2016/04/21/speech-processing-for-machine-learning.html" (Year: 2016).*

Maxime Jumelle et al., 'Speaker Clustering With Neural Networks And Audio Processing', AIPCloud—http://aipcloud.io {maxime, taqiyeddine} @aipcloud.io, Nov. 2017.

International Search Report dated Mar. 18, 2020, issued in International Patent Application No. PCT/KR2019/016152.

Khoury et al.; Hierarchical speaker clustering methods for the NIST i-vector Challenge; Odessey 2014; The Speaker and Language Recognition Workshop; XP 55848790 A; Jun. 16-19, 2014; Jeonsuu, Finland.

Kao et al.; Automatic Detection of Speech Under Cold Using Discriminative Autoencoders and Strength Modeling with Multiple Sub-Dictionary Generation; International Workshop on Acoustic Signal Enhancement (IWAENC2018); XP 33439054 A; Sep. 2018; Tokyo, Japan.

Li et al.; Recent Advancements in Automatic Speaker Authentication; IEEE Robotics & Automation Magazine; XP 55390647 A; Mar. 1999.

Wang et al.; What Does the Speaker Embedding Encode? Interspeech 2017; XP 55606272 A; Aug. 20-24, 2017 Stockholm, Sweden.

European Search Report dated Oct. 21, 2021; European Appln. No. 19887083.4-1207 / 3857546 PCT/KR2019016152.

* cited by examiner

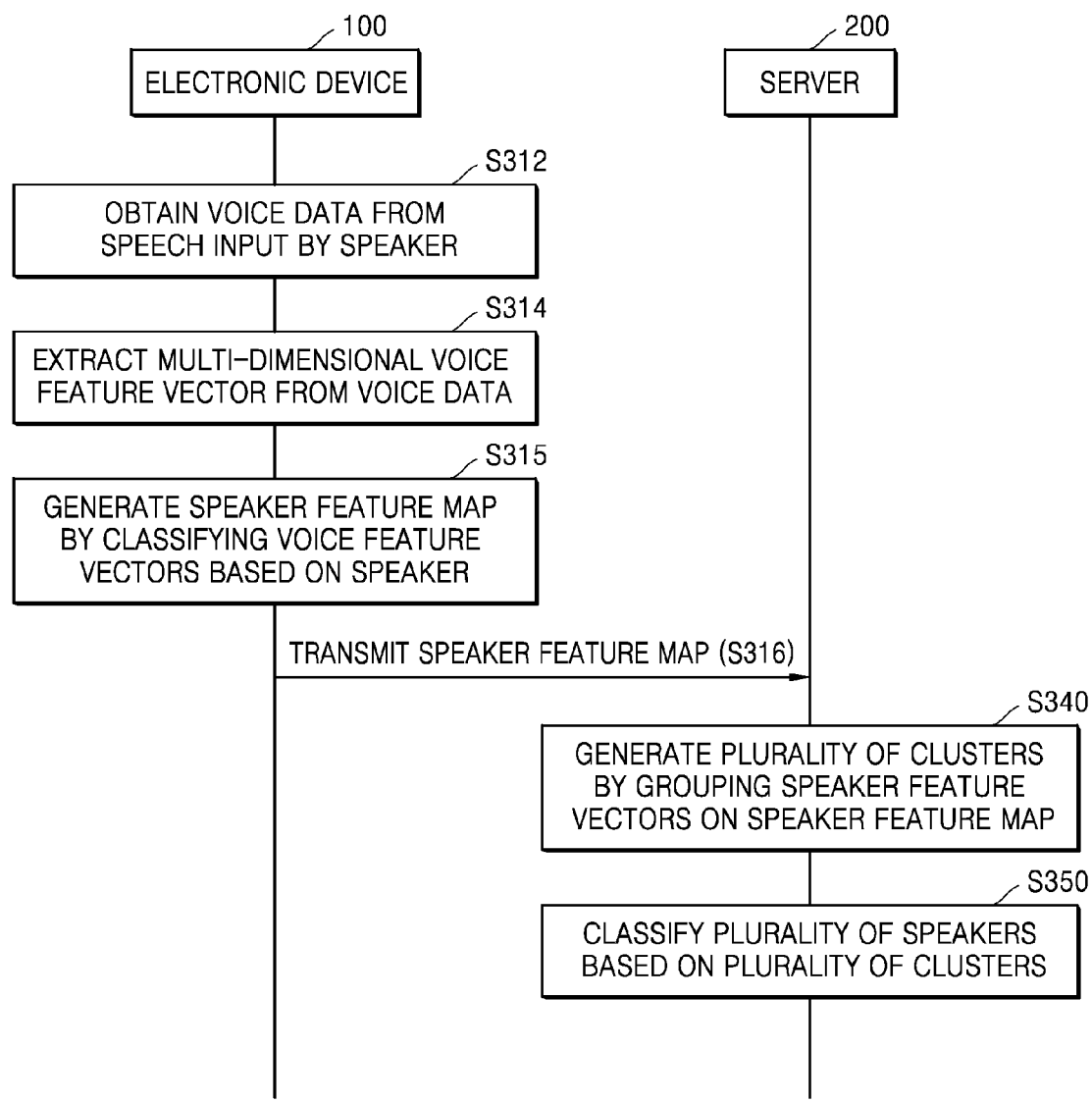

<SPEAKER A>

PHONEME

| FREQUENCY | | b | d | f | g |
|---|---|---|---|---|---|
| | HIGH | 80 | 60 | 20 | 30 |
| | MIDDLE | 20 | 50 | 80 | 20 |
| | LOW | 0 | 10 | 0 | 10 |

400B

<SPEAKER B>

PHONEME

| FREQUENCY | | b | d | f | g |
|---|---|---|---|---|---|
| | HIGH | 0 | 50 | 20 | 0 |
| | MIDDLE | 20 | 40 | 80 | 30 |
| | LOW | 60 | 10 | 0 | 40 |

FIG. 4B

| SPEAKER A | X | Y | Z |
|---|---|---|---|
| SPEAKER A | 0 | 6 | 3 |
| SPEAKER B | 6 | 5 | 0 |

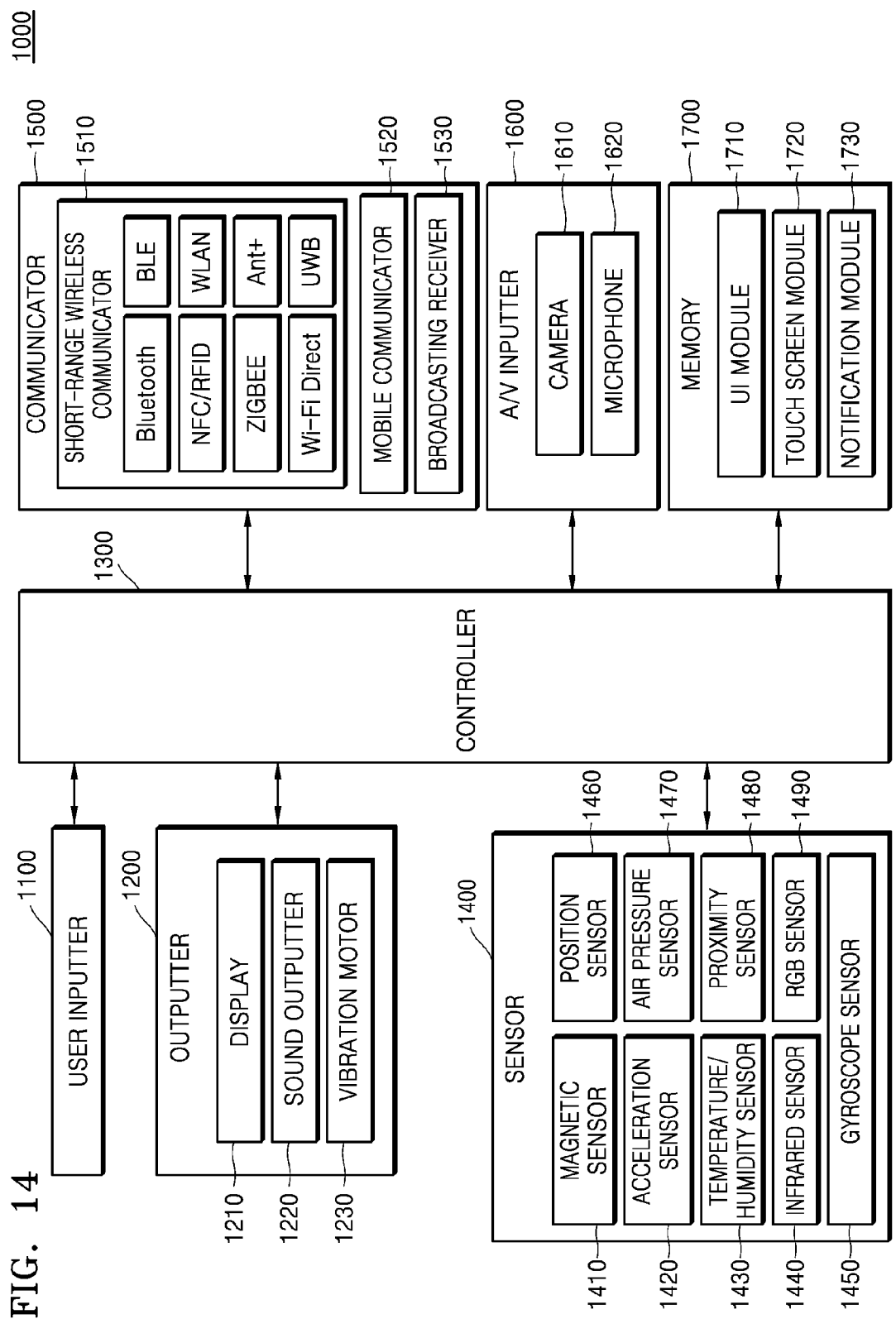

APPARATUS FOR CLASSIFYING SPEAKERS USING A FEATURE MAP AND METHOD FOR OPERATING THE SAME

CROSS-REFERENCE TO RELATED APPLICATION(S)

This application is based on and claims priority under 35 U.S.C. § 119(a) of a Korean patent application number 10-2018-0145644, filed on Nov. 22, 2018, in the Korean Intellectual Property Office, the disclosure of which is incorporated by reference herein in its entirety.

BACKGROUND

1. Field

The disclosure relates to a method and an apparatus for processing voice data of a speech received from a user.

2. Description of Related Art

With developments in multimedia technologies and network technologies, a user may be provided with various services by using a device. Recently, with developments in artificial intelligence (AI) technologies, a user may input voice to a device and execute an operation of the device based on the input of the voice.

In the case of a multi-user device used by a plurality of users, in order to provide a personalized service based on a voice input of each of the users, it is required to recognize a user from a speech. According to the related art, a technique is used, whereby, after a speech of a user is input and stored in a device and identification information of the user corresponding to the stored speech is registered, user recognition is performed based on a matching probability of a comparison between a speech input from a user and the pre-registered speech. However, this technique requires processes of storing a voice of a user and registering identification information, before using the service. Also, according to the related art, there is a limit to predict a relationship among a plurality of users or a current state of a user, based on an input speech.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for processing voice data of a speech received from a speaker. Particularly, the disclosure is to provide a method and an apparatus for extracting a feature vector from voice data of a speech, generating a speaker feature map based on the extracted feature vector, and classifying a speaker based on a positional relationship of the feature vector on the generated speaker feature map.

Another aspect of the disclosure is to provide a method and an apparatus for predicting a relationship among users and state information of a user based on a positional relationship of a feature vector on a speaker feature map.

Additional aspects will be set forth in part in the description which follows and, in part, will be apparent from the description, or may be learned by practice of the presented embodiments of the disclosure.

In accordance with an aspect of the disclosure, a method of processing voice data of a speech is provided. The method includes extracting a speaker feature vector from the voice data of the speech received from a speaker, generating a speaker feature map by positioning the extracted speaker feature vector at a specific position on a multi-dimensional vector space, forming a plurality of clusters indicating features of voices of a plurality of speakers by grouping at least one speaker feature vector positioned on the speaker feature map, and classifying the plurality of speakers according to the plurality of formed clusters.

The generating of the speaker feature map may include training a deep neural network (DNN) model by applying the voice feature vector extracted from the voice data to the DNN model as an input and a feature value with respect to an index of the speaker as an output and extracting the speaker feature vector by using a result of the training.

The method may further include receiving a speech inputting identification information from a user, extracting a speaker feature vector from voice data of the received speech and mapping the extracted speaker feature vector to a cluster from among the plurality of clusters on the speaker feature map, and registering the identification information of the user to the mapped cluster from among the plurality of clusters.

The method may further include, before receiving the identification information from the user, requesting the user to speak a distinct sentence for registering the identification information of the user.

The distinct sentence may include phonemes, for which a difference in an accumulative feature value of frequency between a plurality of speakers corresponding to a plurality of pre-registered clusters is equal to or greater than a predetermined critical value.

The method may further include analyzing an accumulative degree of a frequency feature value of each of phonemes with respect to the speech received from the speaker and based on a result of the analyzing, generating the distinct sentence including the phonemes having a relatively low accumulative degree or a zero accumulative degree.

The forming of the plurality of clusters may include forming the plurality of clusters by grouping at least one speaker feature vector positioned on the speaker feature map within a predetermined distance from each other.

The forming of the plurality of clusters may include training a DNN model by applying the speaker feature vector to the DNN model as an input value and a similarity index among the speakers as an output value and forming the plurality of clusters by grouping at least one similar speaker feature vector based on the training.

The method may further include predicting a relationship among the plurality of speakers corresponding to the plurality of clusters based on distance and directionality information among the plurality of clusters on the speaker feature map.

The method may further include recognizing the speaker of the received speech based on the predicted relationship among the speakers and providing a personalized service synchronized to the recognized speaker.

The method may further include predicting a state of the speaker based on a relative positional relationship among a plurality of speaker feature vectors in one cluster of the plurality of clusters.

The predicting of the state of the speaker may include recognizing directionality by comparing a position of a first feature vector of the speech received from the user with a position of a second feature vector in the cluster on the speaker feature map, wherein the first feature vector is mapped to the cluster, and predicting a health state of the speaker based on the recognized directionality.

The method may further include outputting a message corresponding to the predicted health state of the user from among pre-stored messages.

In accordance with another aspect of the disclosure, an electronic device for processing voice data of a speech is provided. The electronic device includes a speech inputter receiving the speech from a speaker, a controller configured to extract a speaker feature vector from the voice data of the speech received by the speech inputter, generate a speaker feature map by positioning the extracted speaker feature vector at a specific position on a multi-dimensional vector space, form a plurality of clusters indicating features of voices of a plurality of speakers by grouping at least one speaker feature vector positioned on the speaker feature map, and classify the plurality of speakers according to the plurality of formed clusters and a storage storing the speaker feature map.

The controller may further be configured to train a DNN model by applying the voice feature vector extracted from the voice data to the DNN model as an input and a feature value with respect to an index of a speaker as an output and extract the speaker feature vector by using a result of the training.

The speech inputter may receive a speech inputting identification information from a user, and the controller may further be configured to extract a speaker feature vector from voice data of the received speech, map the extracted speaker feature vector to a cluster from among the plurality of clusters on the speaker feature map, and register the identification information of the user to the mapped cluster from among the plurality of clusters.

The electronic device may further include a speaker outputting a voice message, and the controller may further be configured to control the speaker to output the voice message requesting the user to speak a distinct sentence for registering the identification information of the user.

The controller may further be configured to generate the distinct sentence including phonemes, for which a difference in an accumulative feature value of frequency between a plurality of speakers corresponding to a plurality of pre-registered clusters is equal to or greater than a predetermined critical value.

The controller may further be configured to analyze an accumulative degree of a frequency feature value of each of phonemes with respect to the speech received from the speaker and based on a result of the analyzing, generate the distinct sentence including the phonemes having a relatively low accumulative degree or a zero accumulative degree.

The controller may further be configured to form the plurality of clusters by grouping at least one speaker feature vector positioned on the speaker feature map within a predetermined distance from each other.

The controller may further be configured to train a DNN model by applying the speaker feature vector to the DNN model as an input value and a similarity index among the speakers as an output value and form the plurality of clusters by grouping at least one similar speaker feature vector based on the training.

The controller may further be configured to predict a relationship among the plurality of speakers corresponding to the plurality of clusters based on distance and directionality information among the plurality of clusters on the speaker feature map.

The electronic device may further include a display, and the controller may further be configured to recognize the speaker of the received speech based on the predicted relationship among the speakers and display a personalized service synchronized to the recognized speaker on the display.

The controller may further be configured to recognize directionality by comparing a position of a first feature vector of the speech received by the speech inputter with a position of a second feature vector in a cluster on the speaker feature map, wherein the first feature vector is mapped to the cluster, and predict a health state of the user based on the recognized directionality.

The electronic device may further include a speaker outputting a voice message, and the controller may further be configured to control the speaker to output a message corresponding to the predicted health state of the user from among pre-stored messages.

In accordance with another aspect of the disclosure, a computer program product including a non-transitory computer-readable recording medium is provided. The computer program product includes instructions to control an electronic device to receive a speech from a speaker, extract a speaker feature vector from the voice data of the speech that is received, generate a speaker feature map by positioning the extracted speaker feature vector at a specific position on a multi-dimensional vector space, form a plurality of clusters indicating features of voices of a plurality of speakers by grouping at least one speaker feature vector positioned on the speaker feature map, and classify the plurality of speakers according to the plurality of formed clusters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3D is flowchart of an operating method of a system including an electronic device and a server, according to an embodiment of the disclosure;

FIG. 4A is a view for describing a method, performed by an electronic device, of generating a speaker feature map by processing voice data input from a speaker, according to an embodiment of the disclosure;

FIG. 4B is a view for describing a method, performed by an electronic device, of generating a speaker feature map by processing voice data input from a speaker, according to an embodiment of the disclosure;

FIG. 14 is a block diagram of components of an electronic device according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, when a part "includes" an element, it is to be understood that the part additionally includes other elements rather than excluding other elements as long as there is no particular opposing recitation. Also, the terms described in the specification, such as "unit," "module," etc., denote a unit processing at least one function or operation, which may be implemented as hardware or software or a combination thereof.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein.

Hereinafter, embodiments of the disclosure will be described in detail with reference to the drawings.

Figure 1:
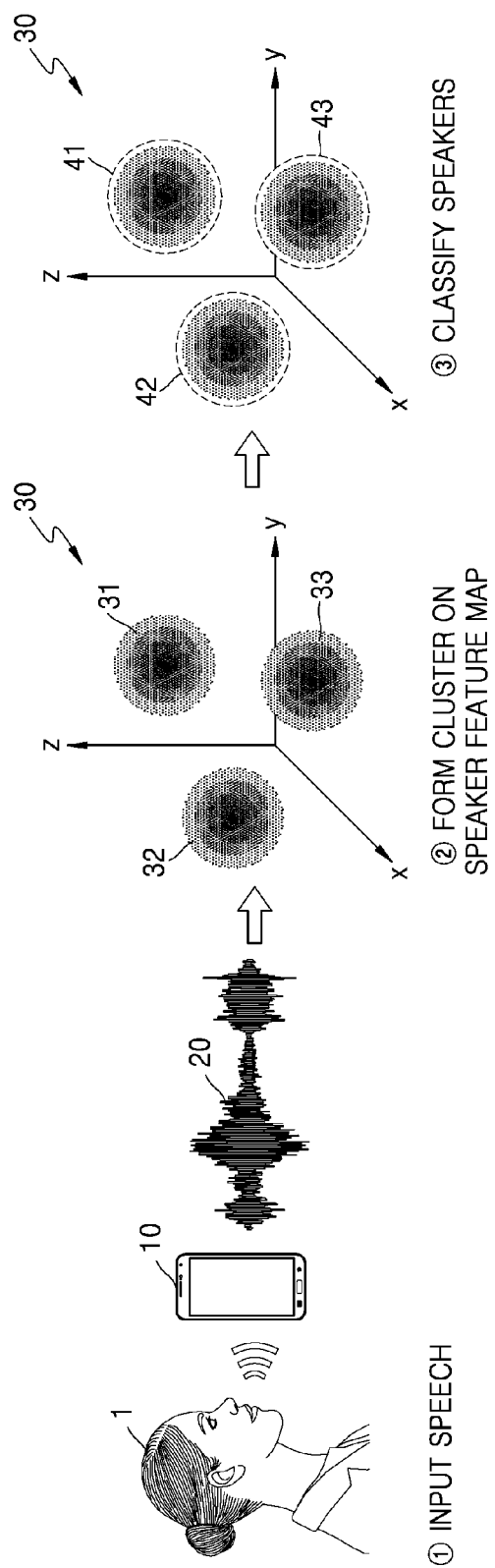
FIG. 1 is a view showing an example of a method, performed by an electronic device, of generating a speaker feature map by processing voice data of a speech input from a speaker, and classifying a plurality of speakers on the speaker feature map, according to an embodiment of the disclosure.

FIG. 1 is a view showing a method, performed by an electronic device, of generating a speaker feature map by processing voice data of a speech received from a speaker, and classifying a plurality of speakers on the speaker feature map, according to an embodiment of the disclosure.

Referring to FIG. 1, an electronic device 10 may receive a speech from a speaker 1. The electronic device 10 may recognize a voice that is input from the speaker 1 and receive the "speech" corresponding to the voice that is input, in which a non-voice section is excluded. The language spoken by the speaker 1 may be referred to as a "spoken language," and the spoken language may correspond to a predetermined instruction. However, it is not limited thereto. The spoken language may correspond to a natural language, which is a language normally used by the speaker 1.

The electronic device 10 may extract voice data 20 from the speech. In this case, the electronic device 10 may detect an actual voice section by detecting a start point and an end point of the voice that is input from the speaker 1 and may extract the voice data 20 from the detected actual voice section.

A voice features may be indicated as a voice feature vector. In detail, the electronic device 10 may extract the voice feature vector of the input voice data 20 by applying a feature vector extraction technique to the voice data 20. According to an embodiment of the disclosure, the electronic device 10 may extract the voice feature value of the voice data 20 that is input, by using any one feature vector extraction technique from among cepstrum, linear predictive coefficient (LPC), mel frequency cepstral coefficient (MFCC), and filter bank energy. The described feature vector extraction techniques are only examples, and the feature vector extraction techniques used by the disclosure are not limited to the described examples.

The extracted voice feature vector may be an n-dimensional vector, where n is equal to or greater than 2. Also, the extracted voice feature vector may include at least two vector columns.

A speaker feature may be indicated as a speaker feature vector. In detail, the electronic device 10 may extract the speaker feature vector by applying a deep neural network (DNN) model to the voice feature vector extracted from the voice data 20. The electronic device 10 may obtain the speaker feature vector by training the DNN model by applying the voice feature vector to the DNN model as an input value and applying a speaker feature value to the DNN model as an output value. Here, a speaker index may denote a value obtained by transforming speaker identification information into a vector value by using at least one coding from among one hot coding, word2vec, and GloVe.

The DNN model may include at least one of a convolution neural network (CNN), a recurrent neural network (RNN), or a generative adversarial network (GAN). However, the DNN model is not limited to the above described examples.

The DNN model used by the electronic device 10 according to the disclosure may include all types of DNN models that are currently known.

According to an embodiment of the disclosure, the voice feature vector input to the DNN model may be an n-dimensional vector, where n is equal to or greater than 2 Also, the voice feature vector input to the DNN model may include at least two vector columns. The speaker feature vector extracted by training the DNN model may be an n-dimensional vector, where n is equal to or greater than 2.

According to another embodiment of the disclosure, the speaker feature vector may be indicated as an i-vector, which is a feature vector. In detail, when the distribution of sound parameters extracted from voice data is modeled by using a Gaussian mixture model (GMM), information in which a universal background model (UBM) is subtracted from a GMM super vector generated by connecting average Gaussian values, may be indicated as multiplication of the i-vector by a total variable transformation matrix. Here, the UBM may be a value obtained by using a large volume of data indicating voice features of a plurality of various speakers, and the total variable transformation matrix may be a value determined based on a speaker recognition model, for example, the GMM, etc., and thus, the electronic device 10 may obtain the i-vector by obtaining the voice feature vector from the voice data of the speaker.

The electronic device 10 may generate a speaker feature map 30 displaying the speaker feature vector at a specific position of an n-dimensional virtual space. N-dimensional speaker feature vectors 31, 32, and 33 extracted from the voice data 20 input by a plurality of speakers may be positioned at specific positions of the speaker feature map 30, the specific positions corresponding to feature vector values. It is illustrated in FIG. 1 that both of the speaker feature map 30 and the speaker feature vectors 31, 32, and 33 are three-dimensional. However, it is for convenience of explanation. The speaker feature map 30 and the speaker feature vectors 31, 32, and 33 according to the disclosure are not limited thereto and may be n-dimensional, where n is equal to or greater than 2.

The electronic device 10 may form a plurality of clusters 41, 42, and 43 based on a relative positional relationship among the speaker feature vectors 31, 32, and 33 positioned on the generated speaker feature map 30. As illustrated in FIG. 1, the speaker feature vectors 31, 32, and 33 may be respectively positioned on positions of the speaker feature map 30, the positions corresponding to their speaker feature vector values, respectively, and the speaker feature vectors positioned within a predetermined distance may form a spherical group. According to an embodiment of the disclosure, the electronic device 10 may form the plurality of clusters 41, 42, and 43 by grouping a plurality of speaker feature vectors positioned within a predetermined distance. That is, the electronic device 10 may form each of the clusters 41, 42, and 43 by combining speaker feature vectors gathered on the speaker feature map 30 within a predetermined distance as a group. Here, the "clusters 41, 42, and 43" may be groups of speaker feature vectors having the same voice features and are concepts derived from the aspect that the speaker feature vectors of the voice data, which have similar features, may be positioned on the speaker feature map 30 to be relatively adjacent to one another, and the speaker feature vectors of the voice data, which have non-similar features, may be positioned on the speaker feature map to be relatively far from one another.

The electronic device 10 may classify a plurality of speakers according to the plurality of clusters 41, 42, and 43 formed on the speaker feature map 30. For example, the electronic device 10 may classify a speech having the speaker feature vector 31 mapped in the first cluster 41 as a first user, a speech having the speaker feature vector 32 mapped in the second cluster 42 as a second user, and a speech having the speaker feature vector 33 mapped in the third cluster 43 as a third user.

According to an embodiment of the disclosure, the electronic device 10 may cluster the speaker feature vectors on the speaker feature map 30 according to respective speakers, by applying the DNN model. For example, the electronic device 10 may classify the speaker feature vectors on the speaker feature map according to respective speakers, by training the DNN model by applying the speaker feature vectors to the DNN as an input value and applying an index about a degree of similarity among speakers to the DNN model as an output value. Here, the index about the degree of similarity among speakers may be indicated as 1, for example, when the speakers are the same person, and as a value transformed into 0, when the speakers are not the same persons. The DNN model used and trained by the electronic device 10 may include at least one of a CNN, an RNN, or a GAN, but is not limited to the described examples.

According to an embodiment of the disclosure, the electronic device 10 may predict a relationship among a plurality of speakers corresponding to the plurality of clusters 41, 42, and 43, respectively, based on distance and directionality information of the plurality of clusters 41, 42, and 43 formed on the speaker feature map 30. According to another embodiment of the disclosure, the electronic device 10 may predict the relationship among the plurality of speakers by using a DNN model. This aspect will be described in detail with reference to FIGS. 9 and 10A to 10C of the disclosure. According to an embodiment of the disclosure, the electronic device 10 may predict a state of a speaker based on a positional relationship of a plurality of speaker feature values in any one of the plurality of clusters 41, 42, and 43 on the speaker feature map 30. This aspect will be described in detail with reference to FIGS. 12A, 12B, and 13 of the disclosure.

When a plurality of users use the electronic device 10, the users have to be recognized from speeches, in order to provide a personalized service based on voice inputs of the users. According to the related art, a technique is used, whereby, after the electronic device 10 inputs and stores speeches of a plurality of users in advance and stores and registers user identification information corresponding to the stored speeches, the electronic device 10 performs user recognition based on a matching probability by comparing a speech input from a user with the pre-registered speeches. However, this technique requires processes of storing voices of the users and registering the identification information, before use of the service.

The electronic device 10 according to an embodiment of the disclosure may classify the plurality of speakers by using only the speeches that are input, without additionally registering the user identification information. Thus, the electronic device 10 according to the disclosure may provide a personalized service for each speaker, when the user is not registered, and thus, may improve use convenience.

Figure 2A:
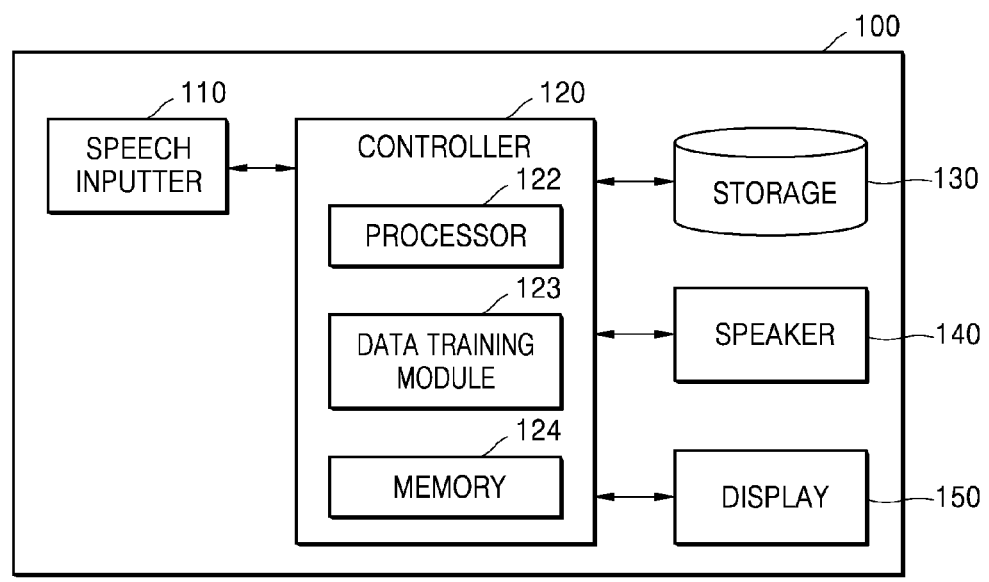
FIG. 2A is a block diagram of components of an electronic device according to an embodiment of the disclosure.

FIG. 2A is a block diagram of components of an electronic device according to an embodiment of the disclosure. The electronic device may be a fixed-type terminal or a mobile terminal realized as a computer device. The electronic device may include, for example, at least one of a smart phone, a cellular phone, a navigation device, a computer, a notebook computer, a digital broadcasting terminal, a personal digital assistant (PDA), a portable multimedia player (PMP), or a tablet personal computer (PC), but it is not limited thereto. The electronic device may communicate with other electronic devices and/or servers via networks by using wireless or wired communication methods.

Referring to FIG. 2A, an electronic device 100 may include a speech inputter 110, a controller 120, a storage 130, a speaker 140, and a display 150. Not all illustrated components of FIG. 2A are essential components of the electronic device 100. The electronic device 100 may be realized by including more components than the illustrated components of FIG. 2A or by including less components than the illustrated components of FIG. 2A.

For example, as illustrated in FIG. 14, an electronic device 1000 according to one or more embodiments may include a user inputter 1100, a sensor 1400, a communicator 1500, and an audio/video (A/V) inputter 1600.

The speech inputter 110 may receive a speech including human voice from a speaker. The speech inputter 110 may recognize a voice that is input and output a result of the recognizing of the voice. The result of the recognizing may include a language spoken by the speaker. "A spoken language," which is the language spoken by the speaker may correspond to a predetermined instruction. However, it is not limited thereto. The spoken language may correspond to a natural language, which is a language normally used by the speaker.

The speech inputter 110 may include a speech recognition engine. The speech recognition engine may recognize the voice spoken by the speaker by applying a voice recognition algorithm to the voice that is input, and may generate a result of the recognizing Here, the voice that is input may be transformed into a form that is appropriate for voice recognition and the speech inputter 110 may detect an actual voice section included in the voice that is input, by detecting a start point and an end point from a voice signal.

The controller 120 may include a processor 122, a data training module 123, and a memory 124. The controller 120 may be realized as a computer-readable recording medium including software, hardware, or the combination of software and hardware.

The processor 122 may be configured to process instructions of a computer program by performing computation, logic, input and output calculation, and signal processing. The instructions of the computer program may be stored in the memory 124 and may be provided to the processor 122 by the memory 124. In embodiments described hereinafter, functions and/or operations performed by the controller 120 may be realized by the processor 122 by executing instructions received according to computer program codes stored in a recording medium, such as the memory 124.

The processor 122 may include, for example, at least one of a central processing unit (CPU), a micro-processor, a graphics processing unit (GPU), an application specific integrated circuit (ASIC), a digital signal processor (DSP), a digital signal processing device (DSPD), a programmable logic device (PLD), or a field programmable gate array (FPGA), but it is not limited thereto. According to an embodiment of the disclosure, when the electronic device 100 is a mobile device, such as a smartphone, a tablet PC, etc., the processor 122 may be an application processor (AP) configured to execute applications.

The data training module 123 may include a hardware device configured to train, by using a DNN model, vector data such as a voice feature vector or a speaker feature vector. The data training module 123 may include a hardware device having computation and training capabilities to train a large volume of data by executing software performing learning via the DNN model.

The memory 124 may include, for example, any one of random access memory (RAM), static random access memory (SRAM), read-only memory (ROM), electrically erasable programmable read-only memory (EEPROM), or programmable read-only memory (PROM), but it is not limited to the described examples.

The controller 120 may extract a speaker feature vector from voice data of a speech input by the speech inputter 110 and generate a speaker feature map by positioning the extracted speaker feature vector at a specific position on a multi-dimensional vector space. According to an embodiment of the disclosure, the speech inputter 110 may extract a voice feature vector of the voice data that is input, by applying, to the voice data detected from the speech of the speaker by using an end point detection (EPD) method, any one feature vector extraction technique from among cepstrum, LPC, MFCC, and filter bank energy. Here, the extracted voice feature vector may be extracted based on a size of a voice signal value accumulated in a frequency range of each phoneme and may be an n-dimensional vector, where n is equal to or greater than 2.

The data training module 123 of the controller 120 may extract the speaker feature vector by applying the DNN model with respect to the voice feature vector extracted from the voice data of the speech input from the speaker. The data training module 123 may obtain the speaker feature vector by training the DNN model by applying the voice feature vector to the DNN model as an input value and a speaker feature value as an output value. Here, the DNN model may include at least one of a CNN, an RNN, or a GAN. However, the DNN is not limited to the described examples. The data training module 123 may extract the speaker feature vector from the voice feature vector by using all types of neural network model methods that are currently known. The controller 120 may accumulate extracted n-dimensional speaker feature vectors and may generate a speaker feature map by positioning the accumulated speaker feature vectors at specific positions on n-dimensional vector space, respectively. The speaker feature map may indicate speeches input from a plurality of speakers as vectors, respectively, in a multi-dimensional vector space, that is, an n-dimensional vector space, where n is equal to or greater than 2 As the speaker feature vectors are positioned to be adjacent to one another on the speaker feature map, voices of the speakers may be similar.

The controller 120 may form a cluster by grouping at least one speaker feature vector positioned on the speaker feature map within a predetermined distance. Here, the "cluster" may be a group of the speaker feature vectors having the same voice feature and may be a group unit indicating a voice feature of each speaker. According to an embodiment of the disclosure, the controller 120 may classify the plurality of speakers according to a plurality of formed clusters.

According to an embodiment of the disclosure, the data training module 123 may cluster the speaker feature vectors on the speaker feature map, based on each speaker, by applying the DNN model. For example, the data training module 123 may classify the speaker feature vectors on the speaker feature map according to respective speakers, by training the DNN model by applying the speaker feature vectors to the DNN model as an input value and indices of speakers as an output value. Here, the indices of the speakers may denote a value obtained by transforming speaker identification information into a vector value by using at least one coding from among one hot coding, word2vec, and GloVe. The data training module 123 may analyze whether or not the speaker feature vectors are similar among one another by using the DNN model and may cluster the similar speaker feature vectors. For example, the data training module 123 may cluster the speaker feature vectors by using the DNN model having an output value 1, when speaker 1 and speaker 2 are the same person, and an output value 0, when speaker 1 and speaker 2 are different persons.

According to an embodiment of the disclosure, the data training module 123 may obtain information about a relationship among the speakers by using the DNN model. In detail, the data training module 123 may predict the relationship among the speakers by applying the speaker feature vectors to the DNN model as an input value and information about a relationship among the speakers to the DNN model as a label.

According to an embodiment of the disclosure, the speech inputter 110 may receive a speech inputting identification information from a user, and the controller 120 may extract a speaker feature vector from the speech received from the user and map the extracted speaker feature vector to one of a plurality of clusters on a speaker feature map. Here, a mapping method used by the controller 120 may be to compare the speaker feature vector extracted from the received speech with the speaker feature vector on the speaker feature map, and may correspond to direct comparison or a statistical method. Here, the direct comparison refers to a method in which a unit, such as a word, a phoneme, etc., which is to be recognized, is set as the speaker feature vector, and how similar an input voice is with the speaker feature vector is measured. The direct comparison may include vector quantization. The statistical method refers to a method in which a unit to be recognized is set as a state sequence and a relationship among state sequences is used. The statistical method may include dynamic time warping (DTW), hidden Markov model (HMM), a method using a neural circuit network, etc.

The controller 120 may map the speaker feature vector extracted from the speech input from the user to the cluster and may register and store user identification information to the mapped cluster. A detailed method, performed by the controller 120, of registering the user identification information will be described in detail with reference to FIGS. 6A to 6C of the disclosure.

The controller 120 may generate a distinct sentence for registering the user identification information, and may control the speaker 140 to output a voice message requesting the user to speak the generated distinct sentence. According to an embodiment of the disclosure, the controller 120 may generate the distinct sentence including phonemes, for which a difference in a frequency signal value between the plurality of speakers included in the plurality of clusters, the speakers being pre-registered on the speaker feature map, is equal to or greater than a predetermined critical value. According to an embodiment of the disclosure, the controller 120 may analyze a degree of accumulation of a frequency signal value of each phoneme with respect to the speech input from the speaker, and may generate the distinct sentence including phonemes having a relatively low degree of accumulation or a zero degree of accumulation. A detailed method, performed by the controller 120, of generating the distinct sentence will be described in detail with reference to FIGS. 7A to 7C of the disclosure.

The controller 120 may predict a relationship among the plurality of speakers corresponding to the plurality of clusters, based on a degree of distance and directionality among the plurality of clusters on the speaker feature map. According to an embodiment of the disclosure, the controller 120 may recognize the speaker of the speech that is input, based on the predicted relationship among the speakers, and provide a personalized service synchronized to the recognized speaker. According to an embodiment of the disclosure, the data training module 123 may recognize the speaker from the speaker feature vector by using the DNN model and predict the relationship among the speakers. This aspect will be described in detail with reference to FIGS. 9 to 11 of the disclosure.

The controller 120 may extract the speaker feature vector of the speech of the user, which is received by the speech inputter 110, map the extracted speaker feature vector to a specific cluster on the speaker feature map, and predict a health state of the user based on a positional relationship between other speaker feature vectors in the mapped cluster and the speaker feature vector of the speech that is input. According to an embodiment of the disclosure, the controller 120 may extract a first feature vector from the speech of the user that is received by the speech inputter 110, map the first feature vector to a specific cluster on the speaker feature map, recognize directionality by comparing a position of a second feature vector in the mapped cluster with a position of the first feature vector, and predict the health state of the user based on the recognized directionality. A detailed method of this aspect will be described in detail with reference to FIGS. 12A, 12B, and 13 of the disclosure.

The storage 130 may store the speaker feature vectors extracted by the controller 120 and the speaker feature map. The storage 130 may include, for example, at least one type of storage medium, from among a flash memory type storage medium, a hard disk type storage medium, a multi-media card micro type storage medium, a card type memory (for example, a secure digital (SD) or an extreme digital (XD) memory), a magnetic memory, a magnetic disk, and an optical disk, but it is not limited to the described examples.

According to an embodiment of the disclosure, the storage 130 may not be a component included in the electronic device 100 and may be realized as an external network server or a cloud server. In this case, the speaker feature vectors extracted by the controller 120 and the speaker feature map may be stored in an external network server or a cloud server and the controller 120 may access the feature vectors and the speaker feature map via a communication network. This aspect will be described in detail with reference to FIG. 2B.

The speaker 140 may output voice data related to functions performed by the electronic device 100. The functions may include, for example, a message reception sound, a notification sound, etc. The speaker 140 may output a voice message stored in the storage 130 or a voice message generated by the controller 120. According to an embodiment of the disclosure, the speaker 140 may output a voice message requesting a user to speak the distinct sentence for registering the user identification information. According to an embodiment of the disclosure, the speaker 140 may output a voice message corresponding to a health state of the user predicted by the controller 120.

The display 150 may display a personalized service synchronized to the speaker recognized by the controller 120. The display 150 may include a physical device including, for example, at least one of a cathode ray tube (CRT) display, a liquid crystal display (LCD) display, a plasma display panel (PDP) display, an organic light-emitting diode (OLED) display, a field emission display (FED) display, a light-emitting diode (LED) display, a vacuum fluorescent display (VFD) display, a digital light processing (DLP) display, a flat panel display, a 3D display, or a transparent display, but it is not limited thereto. According to an embodiment of the disclosure, the display 150 may be formed as a touch screen including a touch interface. When the display 150 is formed as a touch screen, the display 150 may be integrated with a touch pad and may receive a touch input from a user.

Figure 2B:
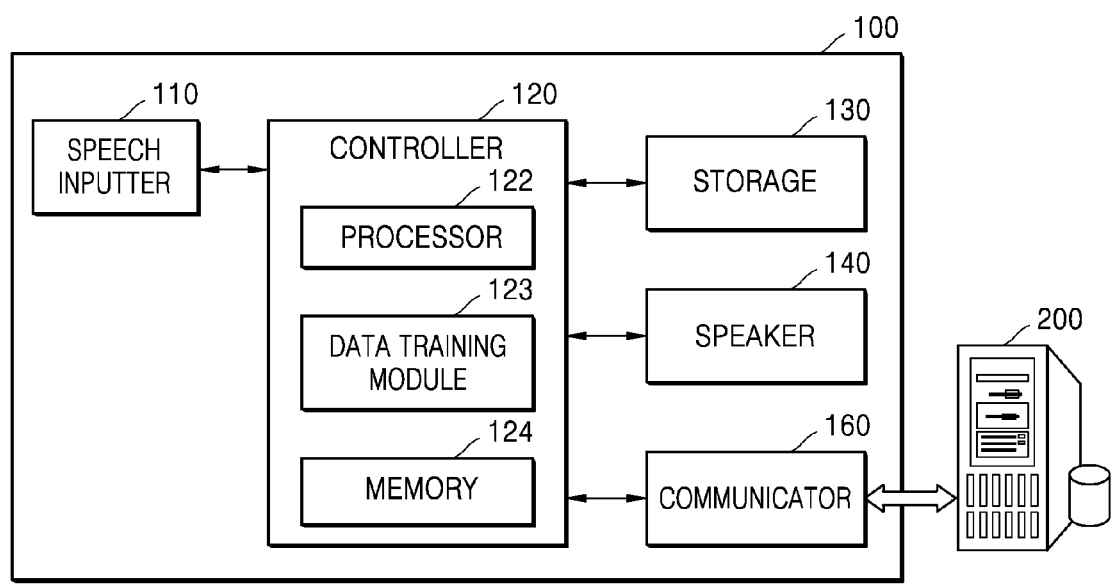
FIG. 2B is a block diagram of components of an electronic device and a server, according to an embodiment of the disclosure.

FIG. 2B is a block diagram of components of an electronic device and a server according to an embodiment of the disclosure.

Referring to FIG. 2B, the electronic device 100 may include the speech inputter 110, the controller 120, the speaker 140, the display 150, and a communicator 160. The speech inputter 110, the controller 120, the speaker 140, and the display 150 from among the components illustrated in FIG. 2B are the same as the components illustrated in FIG. 2A, respectively, and thus, repeated descriptions will not be given. The electronic device 100 illustrated in FIG. 2B may not include the storage 130, unlike the electronic device 100 illustrated in FIG. 2A. However, it is not limited thereto, and the electronic device 100 illustrated in FIG. 2B may also include the storage 130 (refer to FIG. 2A).

Referring to FIG. 2B, the electronic device 100 may transmit and receive data to and from a server 200 via the communicator 160. The communicator 160 may be connected to the server 200 via a wired or a wireless communication method and may perform data communication with the server 200. The communicator 160 may perform data communication with the server 200 by using at least one of data communication methods, such as wired local area network (LAN), wireless LAN, Wi-Fi, Bluetooth, Zigbee, Wi-Fi direct (WFD), infrared data association (IrDA), Bluetooth low energy (BLE), near field communication (NFC), wireless broadband internet (Wibro), world interoperability for microwave access (WiMAX), shared wireless access protocol (SWAP), wireless gigabit alliance (WiGiG), and RF communication.

According to an embodiment of the disclosure, the electronic device 100 may obtain voice data from a speech input from a speaker via the speech inputter 110 and may transmit the obtained voice data to the server 200. The server 200 may generate a speaker feature map via the voice data received from the electronic device 100. This aspect will be described in detail with reference to FIG. 3B.

The server 200 may be a voice recognition server or a speaker recognition server. FIG. 2B illustrates one server 200, but it is an example for convenience of explanation. According to an embodiment of the disclosure, the server 200 may include one or more servers 200.

According to an embodiment of the disclosure, the electronic device 100 may obtain the voice data from the speech that is input from the speaker, extract a multi-dimensional voice feature vector from the obtained voice data, and transmit the extracted voice feature vector to the server 200 via the communicator 160. Here, the voice data may be, for example, an audio file of the speech. The server 200 may generate a speaker feature map via training related to classification of the voice feature vector received from the electronic device 100, for each speaker. This aspect will be described in detail with reference to FIG. 3C.

According to an embodiment of the disclosure, the electronic device 100 may obtain the voice data from the speech that is input from the speaker, extract a multi-dimensional voice feature vector from the voice data, and extract a speaker feature vector by training a DNN model by having the extracted voice feature vector as an input and a speaker as an output. The electronic device 100 may generate a speaker feature map indicating the extracted speaker feature vector on a multi-dimensional vector space, and transmit the generated speaker feature map to the server 200 via the communicator 160. This aspect will be described in detail with reference to FIG. 3D.

Figure 3A:
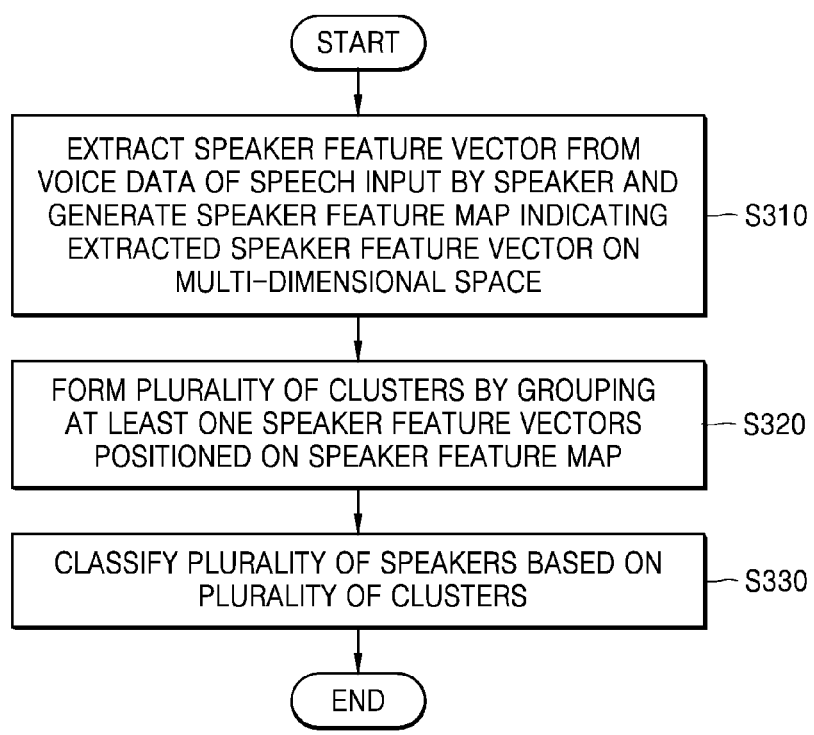
FIG. 3A is a flowchart of a method, performed by an electronic device, of processing voice data of a speech input from a speaker, according to an embodiment of the disclosure.

FIG. 3A is a flowchart of a method, performed by an electronic device, of processing voice data of a speech received from a speaker, according to an embodiment of the disclosure.

Referring to FIG. 3A, in operation S310, the electronic device 100 may extract a speaker feature vector from the voice data of the speech received from the speaker, and generate a speaker feature map indicating the extracted speaker feature vector on a multi-dimensional space.

According to an embodiment of the disclosure, the electronic device 100 may extract the voice feature value of the voice data that is input, by using, with respect to the voice data of the speech, any one feature vector extraction technique from among cepstrum, LPC, MFCC, and filter bank energy. The extracted voice feature vector may be an n-dimensional vector, where n is equal to or greater than 2 Also, the extracted voice feature vector may include at least two vector columns.

A speaker feature may be indicated as a speaker feature vector. In detail, the electronic device 100 may extract the speaker feature vector by applying a DNN model to the voice feature vector. The electronic device 100 may obtain the speaker feature vector by training the DNN model by applying the voice feature vector to the DNN model as an input value and a speaker feature value as an output value. Here, the DNN model may include at least one of a CNN, an RNN, or a GAN. However, the DNN model is not limited to the described examples.

According to an embodiment of the disclosure, the voice feature vector input to the DNN model may be an n-dimensional vector, where n is equal to or greater than 2 Also, the voice feature vector input to the DNN model may be at least two vector columns. The speaker feature vector extracted by training the DNN model may be an n-dimensional vector where n is equal to or greater than 2.

According to another embodiment of the disclosure, the electronic device 100 may indicate the speaker feature vector as an i-vector, which is a feature vector. The electronic device 100 may obtain the i-vector by obtaining the voice feature vector from the voice data of the speaker.

The electronic device 100 may generate a speaker feature map by positioning extracted speaker feature vectors on positions of an n-dimensional virtual space, the positions corresponding to vector values of the speaker feature vectors, respectively.

In operation S320, the electronic device 100 may form a plurality of clusters by grouping at least one speaker feature vector positioned on the speaker feature map.

According to an embodiment of the disclosure, the electronic device 100 may form the cluster by grouping a group of the speaker feature vectors gathered on the speaker feature map within a predetermined distance into a virtual group. The cluster is a concept derived from the aspect that the speaker feature vectors of the voice data, which have similar features, may be positioned on the speaker feature map to be relatively adjacent to one another, and the speaker feature vectors of the voice data, which have non-similar features, may be positioned on the speaker feature map to be relatively far from one another. The cluster may indicate a voice feature of each speaker.

According to an embodiment of the disclosure, the electronic device 100 may cluster the speaker feature vectors on the speaker feature map, based on each speaker, by applying the DNN model. For example, the electronic device 100 may classify the speaker feature vectors on the speaker feature map according to respective speakers, by training the DNN model by applying the speaker feature vectors to the DNN model as an input value and indices of speakers as an output value. Here, the indices of the speakers may denote a value obtained by transforming speaker identification information into a vector value by using at least one coding from among one hot coding, word2vec, and GloVe.

In operation S330, the electronic device 100 may classify a plurality of speakers according to a plurality of clusters. For example, the electronic device 100 may classify a speech having a speaker feature vector mapped in a first cluster from among the plurality of clusters, as a first user, a speech having a speaker feature vector mapped in a second clusters, as a second user, and a speech having a speaker feature vector mapped in a third cluster, as a third user.

Figure 3B:
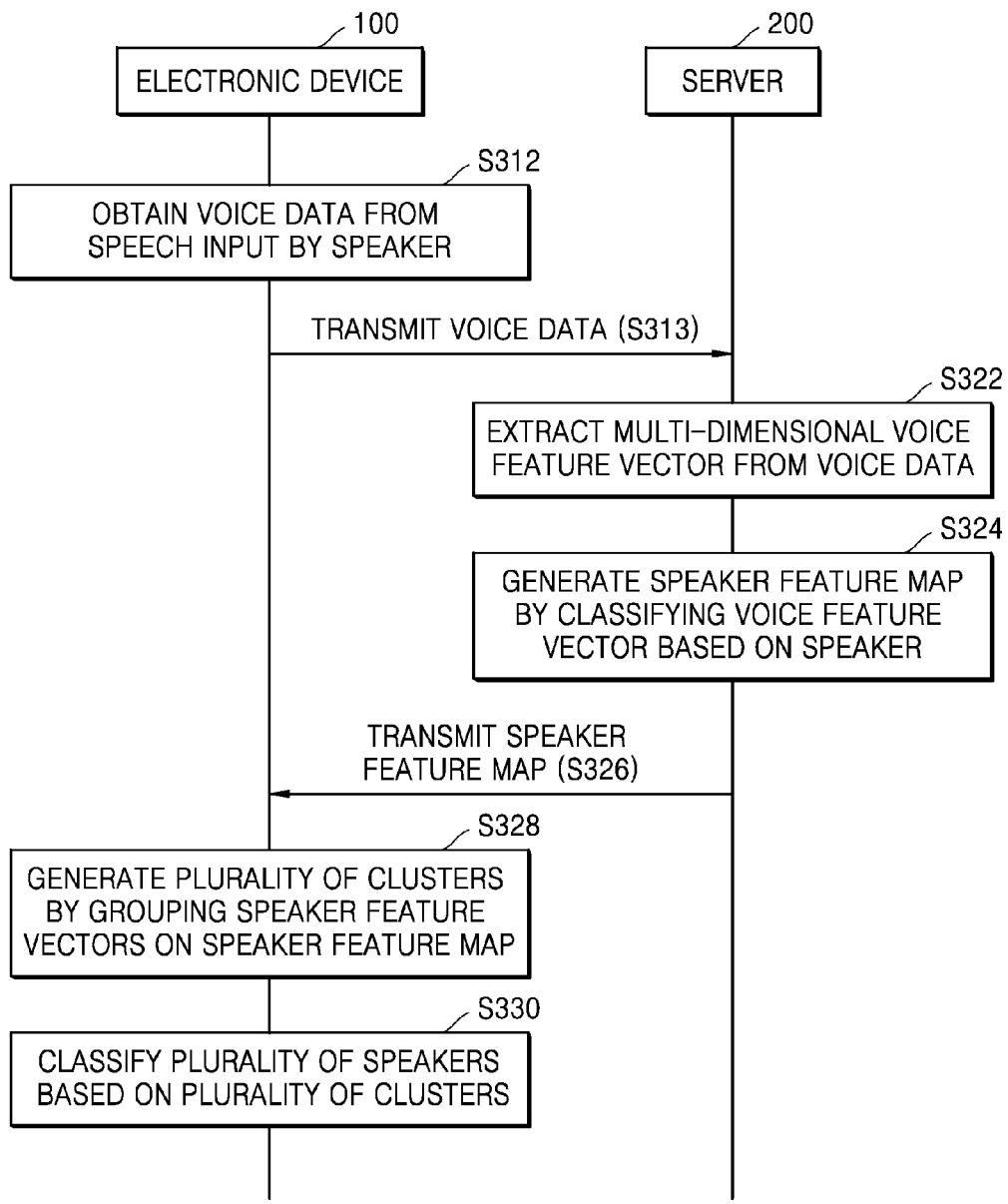
FIG. 3B is flowchart of an operating method of a system including an electronic device and a server, according to an embodiment of the disclosure.
Figure 3C:
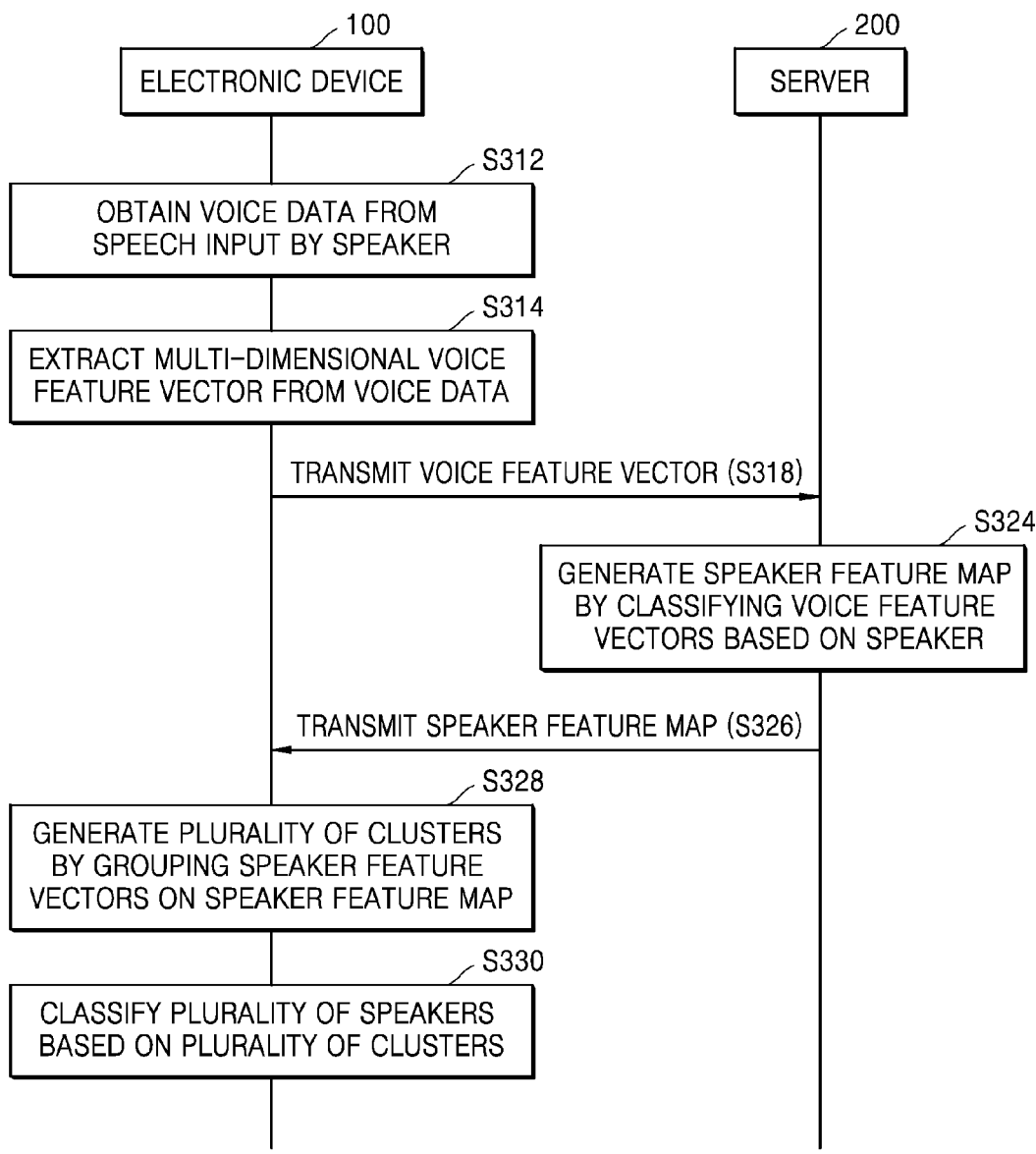
FIG. 3C is flowchart of an operating method of a system including an electronic device and a server, according to an embodiment of the disclosure.

FIGS. 3B to 3D are flowcharts of an operating method of a system including the electronic device 100 and the server 200, according to various embodiments of the disclosure.

Referring to FIGS. 3B to 3D, the server 200 may be a voice recognition server or a speaker recognition server. FIGS. 3B to 3D illustrate one server 200, but it is an example for convenience of explanation. According to an embodiment of the disclosure, the server 200 may include at least one server 200.

Referring to FIG. 3B, the electronic device 100 may transmit and receive data to and from the server 200 via the communicator 160 (refer to FIG. 2B).

In operation S312, the electronic device 100 may obtain voice data from a speech input by a speaker. According to an embodiment of the disclosure, the electronic device 100 may receive the speech from the speaker via a microphone or a speaker and obtain the voice data from the received speech.

In operation S313, the electronic device 100 may transmit the voice data to the server 200.

In operation S322, the server 200 may extract a multi-dimensional voice feature vector from the voice data received from the electronic device 100. According to an embodiment of the disclosure, the server 200 may extract a voice feature value of the input voice data by using, with respect to the voice data, any one feature vector extraction technique from among cepstrum, LPC, MFCC, and filter bank energy. The voice feature vector extracted by the server 200 may be extracted based on a size of a voice signal value accumulated in a frequency range of each phoneme, and may be an n-dimensional vector, wherein n is equal to or greater than 2.

In operation S324, the server 200 may generate a speaker feature map by classifying the voice feature vector according to each speaker. According to an embodiment of the disclosure, the server 200 may extract a speaker feature vector by applying a DNN model to the voice feature vector. The server 200 may obtain the speaker feature vector by training the DNN model by applying the voice feature vector to the DNN model as an input value and a feature value of the speaker as an output value. Here, the DNN model may include at least one of a CNN, an RNN, or a GAN. However, the DNN model is not limited to the described examples.

The server 200 may accumulate extracted n-dimensional speaker feature vectors and may generate the speaker feature map by positioning the accumulated speaker feature vectors at specific positions on n-dimensional vector space, respectively.

In operation S326, the server 200 may transmit the speaker feature map to the electronic device 100.

In operation S328, the electronic device 100 may generate a plurality of clusters by grouping the speaker feature vectors on the speaker feature map. Operation S328 is the same as operation S320 of FIG. 3A, and thus, repeated descriptions will not be given.

In operation S330, the electronic device 100 may classify a plurality of speakers according to the plurality of clusters.

Referring to FIG. 3C, the electronic device 100 may transmit and receive data to and from the server 200 via the communicator 160 (refer to FIG. 2B).

In operation S312, the electronic device 100 may obtain voice data from a speech input by a speaker.

In operation S314, the electronic device 100 may extract a multi-dimensional voice feature vector from the voice data. According to an embodiment of the disclosure, the electronic device 100 may extract the voice feature vector of the voice data that is input, by applying any one feature vector extraction technique from among cepstrum, LPC, MFCC, and filter bank energy, to the voice data included in the speech received from the speaker. The voice feature vector extracted by the electronic device 100 may be extracted based on a size of a voice signal value accumulated in a frequency range of each phoneme and may be an n-dimensional vector, wherein n is equal to or greater than 2.

In operation S318, the electronic device 100 may transmit the voice feature vector to the server 200.

In operation S324, the server 200 may generate a speaker feature map by classifying the voice feature vector according to each speaker. In operation S326, the server 200 may transmit the speaker feature map to the electronic device 100. Operations S324 and S326 are the same as operations S324 and S326 of FIG. 3B, respectively, and thus, repeated descriptions will not be given.

In operation S328, the electronic device 100 may generate a plurality of clusters by grouping the speaker feature vectors on the speaker feature map.

In operation S330, the electronic device 100 may classify a plurality of speakers according to the plurality of clusters.

It is illustrated in FIGS. 3B and 3C that the speaker feature map is generated by the server 200. However, the speaker feature map may be generated by an edge device including the electronic device 100. The edge device may include, for example, a device including at least one of a smartphone, a cellular phone, an AI speaker, a speaker, a navigation device, a computer, a laptop computer, a digital broadcasting terminal, a PDA, or a tablet PC, home appliances having a computational capability, or a device configured to manage other devices, such as a herb (for example, a router), but the edge device is not limited thereto.

Referring to FIG. 3D, the electronic device 100 may generate the speaker feature map and transmit the generated speaker feature map to the server 200.

In operation S312, the electronic device 100 may obtain voice data from a speech received from a speaker. In operation S314, the electronic device 100 may extract a multi-dimensional voice feature vector from the voice data. In operation S315, the electronic device 100 may generate a speaker feature map by classifying the voice feature vector according to each speaker. In operation S316, the electronic device 100 may transmit the generated speaker feature map to the server 200.

In operation S340, the server 200 may generate a plurality of clusters by grouping speaker feature vectors on the speaker feature map received from the electronic device 100. According to an embodiment of the disclosure, the server 200 may form the cluster based on a distance of the speaker feature vectors on the speaker feature map, but it is not limited thereto. According to an embodiment of the disclosure, the server 200 may cluster the speaker feature vectors on the speaker feature map, based on each speaker, by applying a DNN model. For example, the data training module 123 may classify the speaker feature vectors on the speaker feature map according to respective speakers, by training the DNN model by applying the speaker feature vector to the DNN model as an input value and an index of the speaker as an output value.

In operation S350, the server 200 may classify the plurality of speakers according to the plurality of clusters. Here, the server 200 may be a speaker recognition server.

Figure 4B:
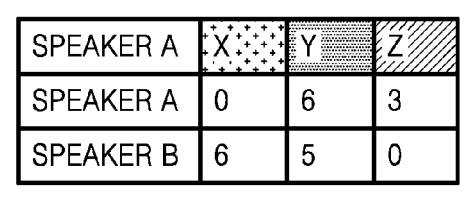
Figure 4C:
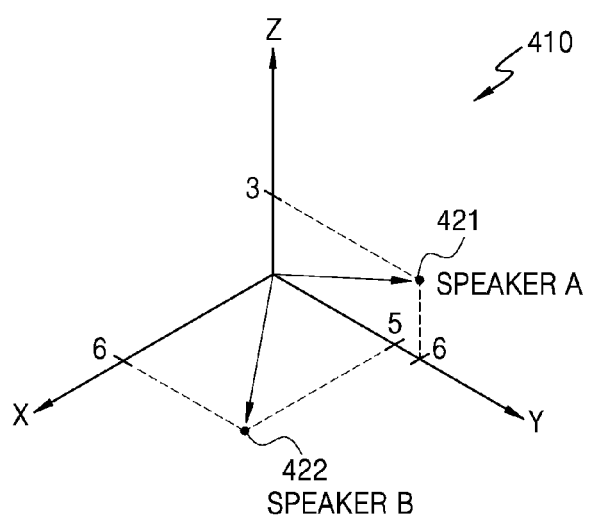
FIG. 4C is a view for describing a method, performed by an electronic device, of generating a speaker feature map by processing voice data input from a speaker, according to an embodiment of the disclosure.

FIGS. 4A to 4C are views for describing a method, performed by the electronic device 100, of generating a speaker feature map by processing voice data input from a speaker, according to various embodiments of the disclosure.

FIG. 4A is a view showing frequency signal values 400A of each phoneme extracted by processing voice data of a speech input by speaker A and frequency signal values 400B of each phoneme extracted by processing voice data of a speech input by speaker B, according to an embodiment of the disclosure.

Referring to FIG. 4A, the numbers are signal values accumulated based on the frequency ranges of each phoneme, and may not be accurate values and may indicate relative sizes. In FIG. 4A, the total frequencies are divided into three ranges, namely, high, middle, and low. The number of the frequency ranges and the extent of the frequency ranges are examples, and the number of the frequency ranges is not limited to 3.

According to an embodiment of the disclosure, when the electronic device 100 receives the speeches from speaker A and speaker B, respectively, the electronic device 100 may detect the voice data from the speeches that are input, and may extract voice feature vectors of the voice data that is input, by applying, to the detected voice data, any one feature vector extraction technique from among cepstrum, LPC, MFCC, and filter bank energy.

As an example of a method of extracting the voice feature vector, the electronic device 100 may use a method of calculating an accumulation amount of the signal value for frequency ranges of each word or each phoneme in the speech, that is, an accumulation amount of energy values of the speech. Referring to the frequency signal values 400A, in the case of the speech of speaker A, with respect to a phoneme /b/ the accumulated energy in a high frequency range is measured to be relatively high as 80 and the accumulated energy in a middle frequency range is measured to be about 20. Likewise, in the speech of speaker A, with respect to a phoneme /d/, the accumulated energy in the high frequency range is measured to be about 60 and the accumulated energy in the middle frequency range is measured to be about 50. In the speech of speaker A, with respect to a phoneme /g/, the accumulated energy in the high frequency range is measured to be about 30 and the accumulated energy in the middle frequency range is measured to be about 20.

Referring to the frequency signal values 400B, in the case of the speech of speaker B, with respect to the phoneme /b/, the accumulated energy in a low frequency range is measured to be relatively high as 60 and the accumulated energy in a middle frequency range is measured to be about 20. In the speech of speaker B, with respect to the phoneme /g/, the accumulated energy in a high frequency range is rarely calculated, that is, the accumulated energy in the high frequency range is calculated as 0, and the accumulated energy in the low frequency range is calculated as about 40.

Referring to the frequency signal values 400A and 400B in the frequency ranges for each phoneme in the case of speaker A and speaker B, even with respect to the same phoneme, the speakers differ in the frequency range in which the energy is relatively more accumulated than the other frequency ranges. For example, in the case of the phoneme /b/, speaker A has a highly accumulated energy in the high frequency range, whereas speaker B has a relatively highly accumulated energy in the low frequency range. The electronic device 100 may generate the voice feature vector indicating a feature of a speech of each speaker based on the energy values calculated in the frequency ranges of each phoneme. Here, the voice feature vector may be formed as a multi-dimensional vector column.

FIG. 4B illustrates an embodiment in which features X, Y, and Z are extracted based on signal values calculated in the frequency ranges of each phoneme of speaker A and speaker B, according to an embodiment of the disclosure.

Referring to FIG. 4B, the electronic device 100 may extract features X, Y, and Z by using a difference between the frequency signal values 400A and 400B in the frequency ranges of each phoneme, the frequency signal values 400A and 400B being calculated in speeches of speaker A and speaker B. Referring to FIG. 4A together, in the case of the phoneme /b/, speaker A has the accumulated energy value of 0 in the low frequency range, whereas speaker B has the accumulated energy value of 60 in the low frequency range. That is, this corresponds to a case in which the difference between the signal value of speaker A and the signal value of speaker B is equal to or greater than a predetermined value. Thus, the electronic device 100 may extract feature X by using the accumulated energy value in the low frequency range, with respect to the phoneme /b/. Likewise, in the case of the phoneme /d/, speaker A has an accumulated energy value 60 in a high frequency range, whereas speaker B has an accumulated energy value 50 in a high frequency range. Thus, the electronic device 100 may extract feature Y by using the accumulated energy value in the high frequency range with respect to the phoneme /d/. By using the same method, the electronic device 100 may extract feature Z by using the accumulated energy value in the high frequency range with respect to a phoneme /f/.

FIG. 4C is a view showing a method, performed by the electronic device 100, of generating speaker feature vectors 421 and 422 by using features extracted from speaker A and speaker B and generating a speaker feature map 410 by positioning the speaker feature vectors 421 and 422 on a multi-dimensional space, according to an embodiment of the disclosure. A detailed method of generating the speaker feature vectors 421 and 422 by using a voice feature vector will be described in detail with reference to FIG. 5.

Referring to FIG. 4C, the electronic device 100 may generate the speaker feature vector 421 having a value of (0, 6, 3) by using features X, Y, and Z extracted with respect to speaker A. Likewise, the electronic device 100 may generate the speaker feature vector 422 having a value of (6, 5, 0) by using features X, Y, and Z extracted with respect to speaker B.

The electronic device 100 may generate the speaker feature map 410 by positioning the speaker feature vector 421 of speaker A that has the value of (0, 6, 3) and the speaker feature value 422 of speaker B that has the value of (6, 5, 0) on a three-dimensional space. The speaker feature vectors 421 and 422 and the speaker feature map 410 are three-dimensionally illustrated in FIG. 4C. However, it is for convenience of explanation and the speaker feature vectors 421 and 422 and the speaker feature map 410 are not limited thereto.

Figure 4D:
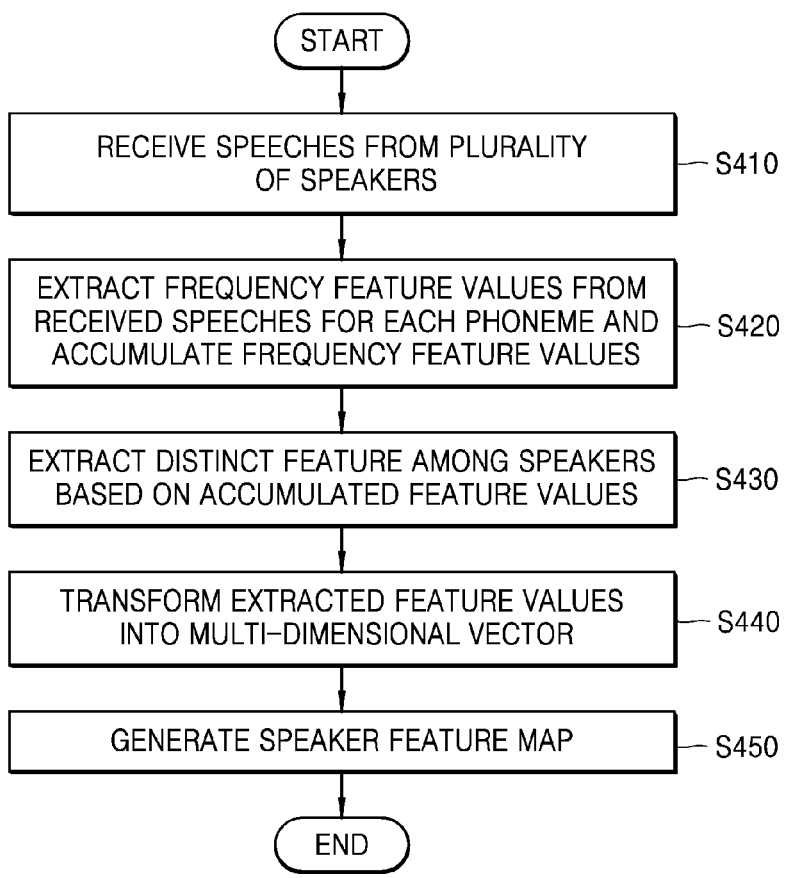
FIG. 4D is a flowchart of a method, performed by an electronic device, of generating a speaker feature map by processing voice data of speeches input from a plurality of speakers, according to an embodiment of the disclosure.

FIG. 4D is a flowchart of a method, performed by an electronic device, of generating a speaker feature map by processing voice data of speeches input by a plurality of speakers, according to an embodiment of the disclosure.

Referring to FIG. 4D, in operation S410, the electronic device may receive the speeches from the plurality of speakers. According to an embodiment of the disclosure, the electronic device 100 may recognize a voice spoken by a speaker by applying a voice recognition algorithm to a voice that is input, by using a voice recognition engine, and generate a result of the recognition. The electronic device 100 may detect an actual voice section included in the voice that is input, by detecting a start point and an end point of a voice signal.

In operation S420, the electronic device 100 may extract a frequency signal value of each phoneme from the speech that is input and accumulate the signal value. According to an embodiment of the disclosure, the electronic device 100 may apply any one feature vector extraction technique from among cepstrum, LPC, MFCC, and filter bank energy, to the voice data detected from the speech that is input. The electronic device 100 may accumulate the relative energy value calculated in each frequency range for each phoneme, with respect to the voice data.

In operation S430, the electronic device 100 may extract a distinct feature among speakers, based on the accumulated signal value. According to an embodiment of the disclosure, the electronic device 100 may extract the feature value when a difference between the accumulated signal values, that is, the accumulated energy values, in the same frequency range and of the same phoneme of the speeches of a plurality of speakers is equal to or greater than a predetermined critical value. The feature value extracted from the phoneme and the frequency range may be plural, and the plurality of feature values may be independent from one another.

In operation S440, the electronic device 100 may transform the extracted feature value into an n-dimensional speaker feature vector, wherein n is equal to or greater than 2.

In operation S450, the electronic device 100 may generate the speaker feature map by positioning the transformed n-dimensional speaker feature vector on positions of a multi-dimensional space, the positions corresponding to values of the speaker feature vectors, respectively.

Figure 5:
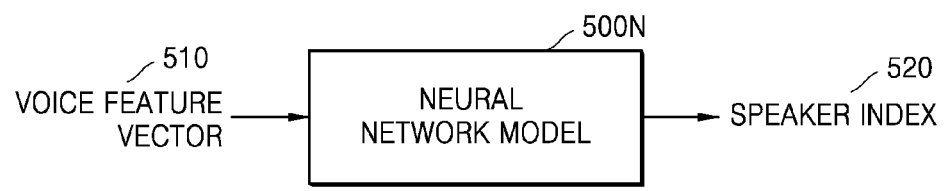
FIG. 5 is a view showing a method, performed by an electronic device, of transforming a voice feature vector into a speaker feature vector by using artificial intelligence (AI) technologies, according to an embodiment of the disclosure.

FIG. 5 is a view showing a method, performed by the electronic device 100, of transforming a voice feature vector 510 into a speaker feature vector by using an AI technique, according to an embodiment of the disclosure. The method illustrated in FIG. 5 may be performed not only by the electronic device 100, but also by the server 200.

Referring to FIG. 5, the electronic device 100 may extract a speaker feature vector by applying a DNN model 500N to the voice feature vector 510. In detail, the electronic device 100 may obtain the speaker feature vector by training the DNN model 500N by applying the voice feature vector 510 to the DNN model 500N as an input value and a speaker index 520 as an output value. Here, the speaker index 520 may be a feature value about a speaker, and may be a vector obtained by transforming an index about each of first through $n^{th}$ speakers into a vector column by using one-hot coding. For example, when n is 3, the speaker index 520 may be formed as a vector column, such as [1, 0, 0], [0, 1, 0], and

[0, 0, 1]. However, it is for convenience of explanation, and the speaker index 520 is not limited to the vector column described above.

The DNN model 500N may include at least one of a CNN, an RNN, or a GAN. However, the DNN model is not limited to the described examples. The DNN model 500N used by the electronic device 100 according to the disclosure may include all types of neural network models that are currently known.

Figure 6A:
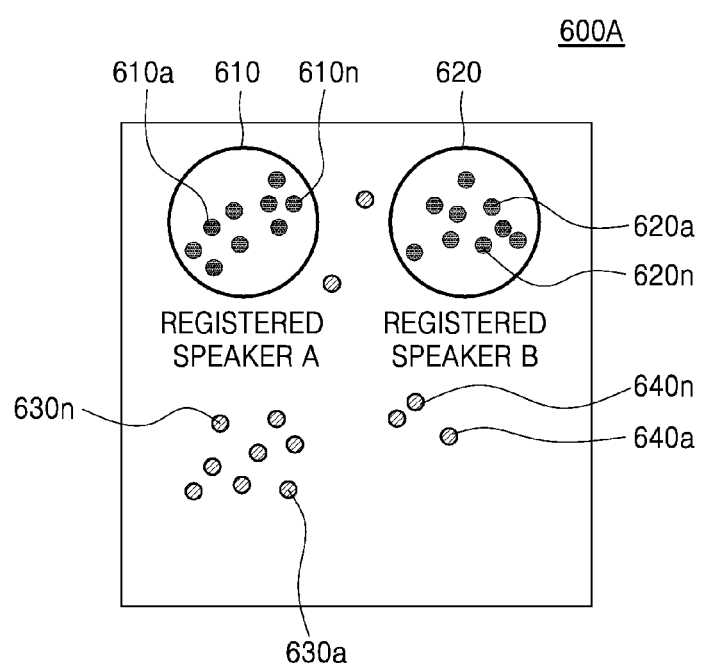
FIG. 6A is a view showing a method, performed by an electronic device, of registering user identification information corresponding to a cluster formed on a speaker feature map, according to an embodiment of the disclosure.
Figure 6B:
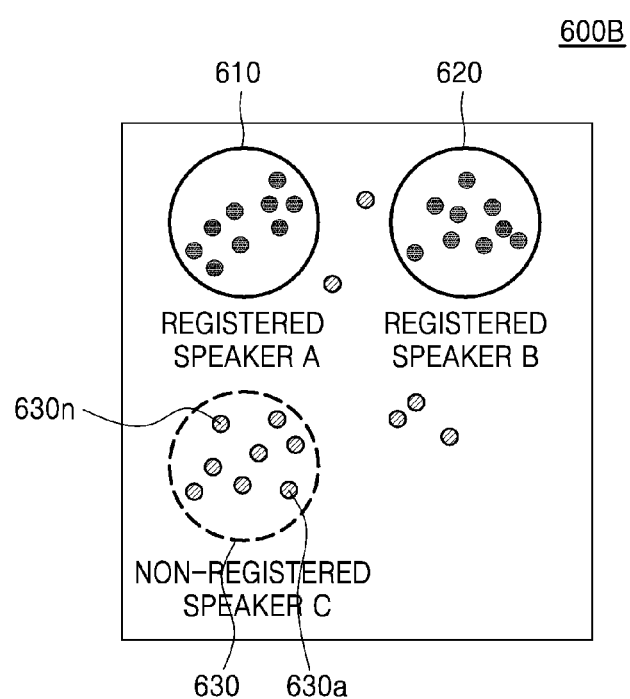
FIG. 6B is a view showing a method, performed by an electronic device, of registering user identification information corresponding to a cluster formed on a speaker feature map, according to an embodiment of the disclosure.
Figure 6C:
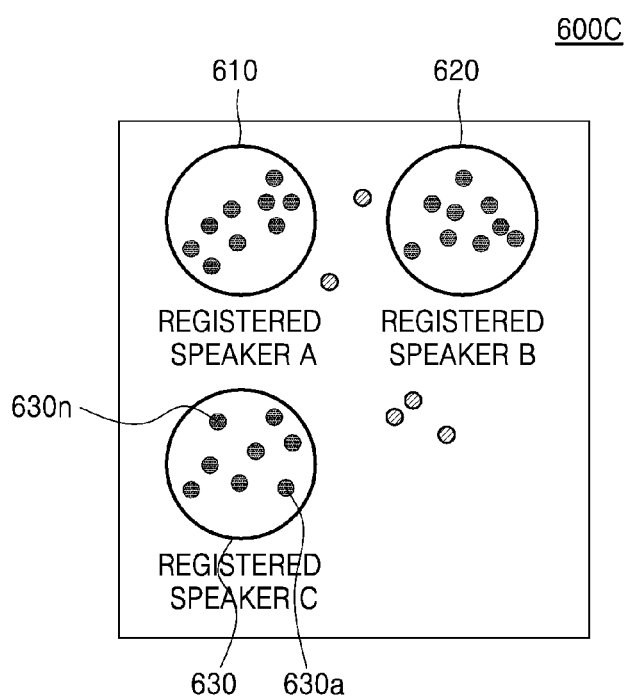
FIG. 6C is a view showing a method, performed by an electronic device, of registering user identification information corresponding to a cluster formed on a speaker feature map, according to an embodiment of the disclosure.

FIGS. 6A to 6C are views showing a method, performed by the electronic device 100, of registering user identification information corresponding to a cluster formed on a speaker feature map, according to various embodiments of the disclosure. All of FIGS. 6A to 6C are views showing speaker feature vectors positioned on speaker feature maps 600A, 600B, and 600C, and although the speaker feature maps 600A, 600B, and 600C are illustrated two-dimensionally, it is for convenience of explanation, and the speaker feature map of the disclosure is not limited thereto.

Referring to the speaker feature map 600A illustrated in FIG. 6A, a plurality of first feature vectors 610a through 610n gathered within a predetermined distance may form a first cluster 610 and a plurality of second feature vectors 620a through 620n gathered within a predetermined distance may form a second cluster 620. In the embodiment illustrated in FIG. 6A, the plurality of first feature vectors 610a through 610n positioned in the first cluster 610 may be registered as a speech of speaker A and identification information of speaker A may be registered. Likewise, the plurality of second feature vectors 620a through 620n positioned in the second cluster 620 may be registered as a speech of speaker B and identification information of speaker B may be registered. Here, the identification information may denote information for identifying a speaker, which includes at least one of user ID, a password, an address, a telephone number, an age, a gender, or SAMSUNG account information of the speaker.

A plurality of third feature vectors 630a through 630n may be gathered on the speaker feature map 600A within a predetermined distance, but may not form an additional cluster. Likewise, a plurality of fourth feature vectors 640a through 640n may be gathered on the speaker feature map 600A within a predetermined distance, but may not form an additional cluster.

Referring to the speaker feature map 600B illustrated in FIG. 6B, the electronic device 100 may form a third cluster 630 by grouping the plurality of third feature vectors 630a through 630n gathered within a predetermined distance.

Referring to the speaker feature map 600C illustrated in FIG. 6C, the electronic device 100 may receive a speech inputting identification information from speaker C classified into the third cluster 630, and may register the identification information of speaker C to correspond to the third cluster 630.

According to an embodiment of the disclosure, the electronic device 100 may output a message requesting speaker C to input identification information, wherein speaker C has spoken a speech corresponding to the plurality of third feature vectors 630a through 630n included in the third cluster 630. According to an embodiment of the disclosure, the message requesting the identification information may be a sound message output via the speaker 140 (see FIGS. 2A and 2B) or a user interface (UI) displayed on the display 150 (see FIGS. 2A and 2B).

The electronic device 100 may receive the speech inputting the identification information of speaker C from speaker C and extract a speaker feature vector from voice data of the received speech. The electronic device 100 may map the speaker feature vector extracted from speaker C to the third cluster 630 and register the identification information input from speaker C in the third cluster 630. Via the process described above, the identification information of speaker C may be stored in the third cluster 630, and the third cluster 630 may be stored in the storage 130 (see FIGS. 2A and 2B) as a cluster of a registered speaker, like the first cluster 610 and the second cluster 620.

Referring to the speaker feature maps 600A, 600B, and 600C illustrated in FIGS. 6A to 6C, the electronic device 100 may extract the speaker feature vectors from the voice data of the speeches input from the plurality of speakers (speakers A, B, and C), may form the clusters by grouping the speaker feature vectors gathered within predetermined distances, may receive the speaker identification information corresponding to the clusters, and may register the identification information in the clusters. Thus, the electronic device 100 may provide a personalized service synchronized according to the identification information of the registered user, for example, a user ID, a telephone number, an address, an age, a gender, etc., and thus, the electronic device 100 may improve user convenience.

Figure 7A:
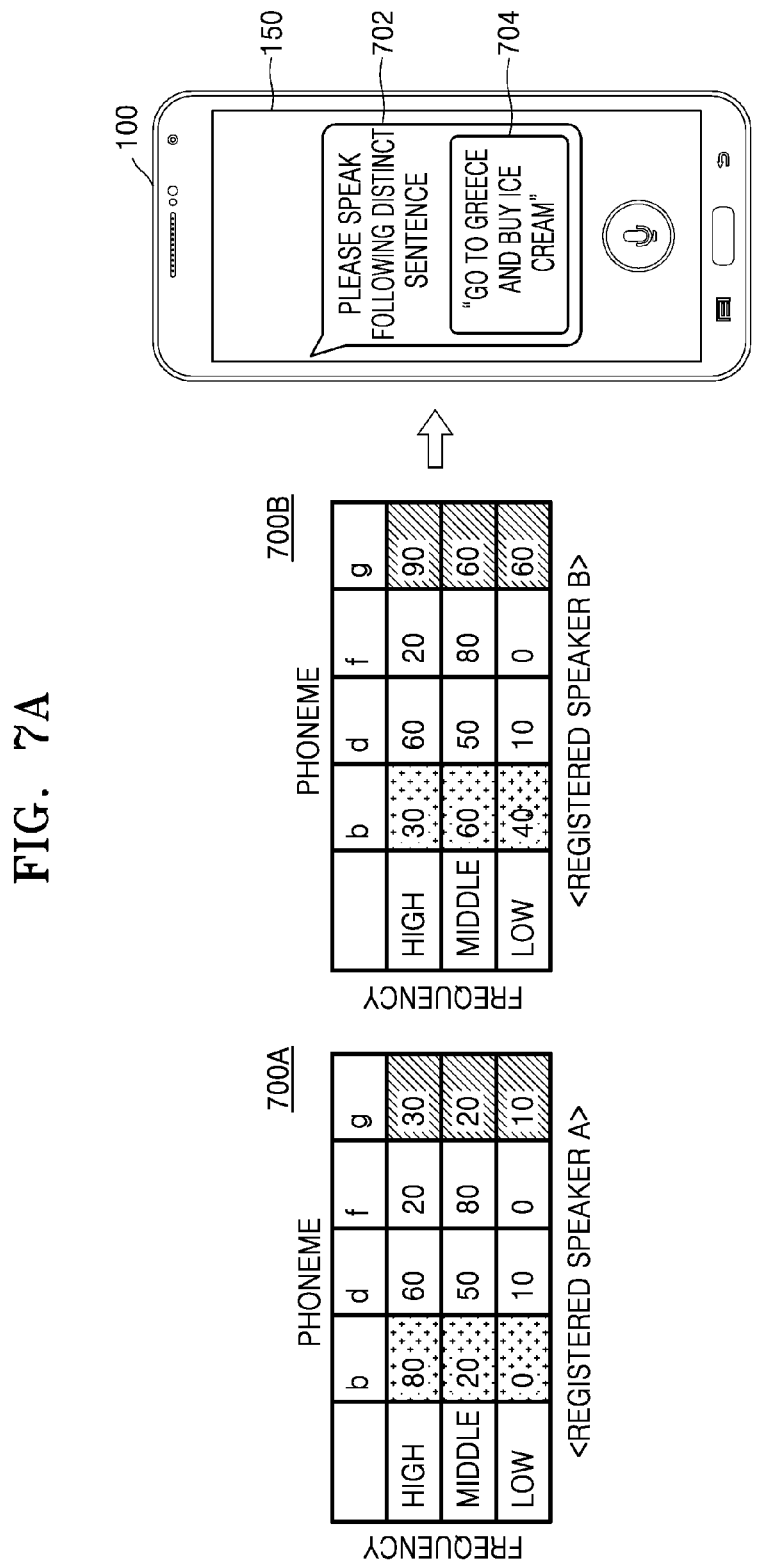
FIG. 7A is a view showing a method of generating a distinct sentence for identifying a speaker on a speaker feature map based on a frequency feature value of each phoneme of a speech and outputting the generated distinct sentence, according to an embodiment of the disclosure.
Figure 7B:
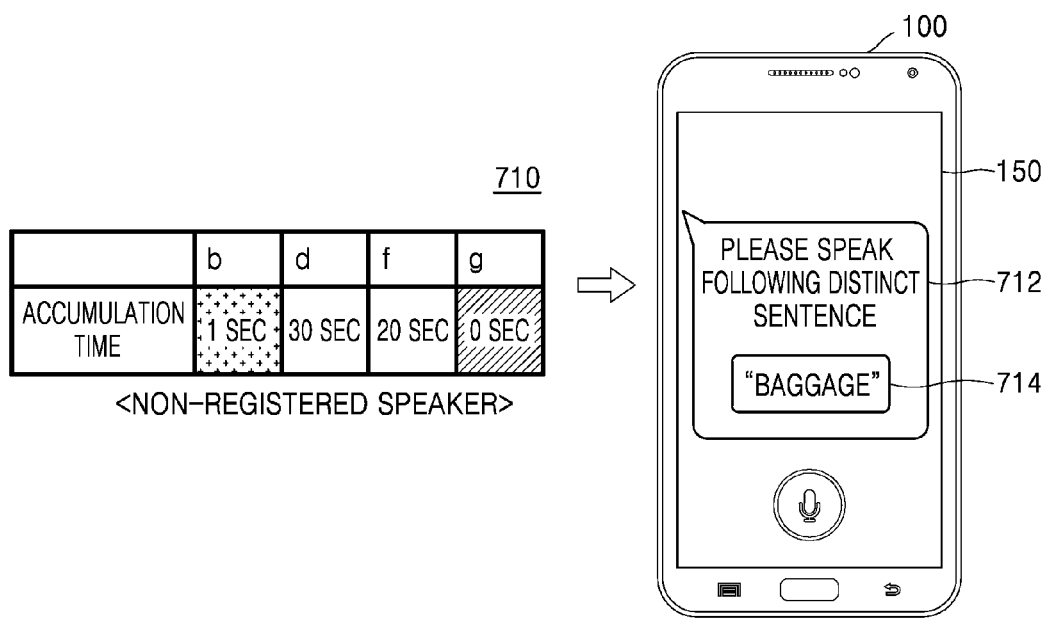
FIG. 7B is a view showing a method of generating a distinct sentence for identifying a speaker on a speaker feature map based on a frequency feature value of each phoneme of a speech and outputting the generated distinct sentence, according to an embodiment of the disclosure.

FIGS. 7A and 7B are views showing a method of generating a distinct sentence for identifying a speaker on a speaker feature map based on a frequency feature value of each phoneme of a speech and outputting the generated distinct sentence, according to various embodiments of the disclosure. The electronic device 100 may receive a speech from a speaker, generate a distinct sentence based on a frequency feature value of each phoneme of the speech, and output the distinct sentence. However, a device configured to generate and output the distinct sentence is not limited to the electronic device 100. According to an embodiment of the disclosure, a server may analyze a frequency feature value of each phoneme of a voice speech received from the electronic device 100 and generate a distinct sentence. In this case, the server may directly store the speaker feature map. The server may transmit the generated distinct sentence to the electronic device 100.

FIG. 7A illustrates tables 700A and 700B about frequency feature values of each phoneme of registered speaker A and registered speaker B, according to an embodiment of the disclosure.

Referring to FIG. 7A, the numbers in tables 700A and 700B are accumulated signal values based on frequency ranges of each phoneme, and the numbers may not be accurate values and may indicate relative sizes. In FIG. 7A, the total frequencies are divided into three ranges, namely, high, middle, and low. The number of the frequency ranges and the extent of the frequency ranges are examples, and the number of the frequency ranges is not limited to 3.

Referring to table 700A, in the case of a speech of registered speaker A, with respect to a phoneme /b/, a signal value corresponding to 80, that is, an accumulated energy value of 80 may be calculated in a high frequency range, and an accumulated energy value of 0 may be calculated in a low frequency range. With respect to a phoneme /g/, in the speech of registered speaker A, an accumulated energy value corresponding to 30 may be calculated in the high frequency range and an accumulated energy value corresponding to 10 may be calculated in the low frequency range.

Referring to table 700B, in the case of a speech of registered speaker B, with respect to a phoneme /b/, a signal value corresponding to 30, that is, an accumulated energy value of 30 may be calculated in a high frequency range, an accumulated energy value of 60 may be calculated in a middle frequency range, and an accumulated energy value of 40 may be calculated in a low frequency range. With respect to a phoneme /g/, in the speech of registered speaker B, an accumulated energy value corresponding to 90 may be calculated in the high frequency range and accumulated energy values corresponding to 60 may be calculated in the middle frequency range and the low frequency range.

Referring to tables 700A and 700B, in the case of the phonemes /b/ and /g/, the accumulated energy values in each frequency range of the speeches of registered speaker A and registered speaker B have a large difference between registered speaker A and registered speaker B, and thus, it is easy to distinguish registered speaker A and registered speaker B. However, in the case of the phonemes /d/ and /f/, the accumulated energy values in each frequency range of the speeches of registered speaker A and registered speaker B has a small difference between registered speaker A and registered speaker B.

According to an embodiment of the disclosure, the electronic device 100 or the server 200 may generate a distinct sentence to map a speech of a speaker not registered, that is, a non-registered speaker, to a cluster of the registered speaker on the speaker feature map. The distinct sentence may be a sentence to distinguish to which one of pre-registered clusters a speech of a user using the electronic device 100 belongs, or to distinguish whether the speech of the user belongs to a cluster of a new speaker, and may be sentence for requesting the user to utter a speech.

According to an embodiment of the disclosure, the electronic device 100 or the server 200 may generate the distinct sentence such that the distinct sentence includes the phonemes, for which a difference in a frequency feature that is, a difference in an accumulated energy value of a frequency range between speeches of pre-registered speakers on the speaker feature map, is equal to or greater than a predetermined critical value. In the embodiment illustrated in FIG. 7A, for example, a distinct sentence 704, "go to Greece and buy an ice cream," including phonemes /g/ and /r/, may be generated.

According to an embodiment of the disclosure, the electronic device 100 may output a message 702 requesting a user to speak the generated distinct sentence 704. The electronic device 100 may display the message 702 requesting the user to speak the distinct sentence 704 on the display 150. However, it is not limited thereto. According to an embodiment of the disclosure, the electronic device 100 may output a sound message requesting the user to speak the distinct sentence 704 through the speaker 140 (refer to FIGS. 2A and 2B). The electronic device 100 may directly generate and output the distinct sentence. However, it is not limited thereto and the electronic device 100 may receive a distinct sentence generated by the server 200 from the server 200 and output the received distinct sentence.

FIG. 7B illustrates table 710 indicating frequency feature values of phonemes in a speech of a non-registered speaker, according to an embodiment of the disclosure. The number described in table 710 denotes an accumulated time of a signal that is calculated with respect to a frequency range of each phoneme.

Referring to table 710, in the case of the speech of the non-registered speaker, with respect to phonemes /d/ and /f/, the phonemes are articulated and accumulated for 30 seconds and 20 seconds, respectively, and a phoneme /b/ is articulated and accumulated for one second and a phoneme /g/ is articulated and accumulated for 0 seconds. It may indicate that the phonemes /d/and/f/have a higher degree of articulation accumulation than the phonemes /b/ and /g/ in the speech of the non-registered speech. In particular, it may indicate that the phoneme /g/ is not accumulated at all.

According to an embodiment of the disclosure, the electronic device 100 may analyze the degrees of accumulation of the frequency feature values of each phoneme in the speech input from the speaker, in particular, the non-registered speaker, and may, based on a result of the analyzing, generate the distinct sentence 714 including the phonemes having relatively low degrees of accumulation or not accumulated at all.

Referring to FIG. 7B, the phoneme /b/ has a relatively lower degree of accumulation than the phonemes /d/ and /f/ and the phoneme /g/ is not accumulated. Thus, the electronic device 100 may generate the distinct sentence 714 including the phonemes /b/ and /g/. For example, the distinct sentence 714 may be "baggage." However, the subject generating the distinct sentence 714 is not limited to the electronic device 100. According to an embodiment of the disclosure, the server 200 may analyze the frequency feature value of each phoneme in a voice speech received from the electronic device 100 and may generate the distinct sentence 714 including the phoneme (/b/ in the embodiment illustrated in FIG. 7B) having a low accumulation degree and the phoneme (/g/ in the embodiment illustrated in FIG. 7B) not accumulated. In this case, the server 200 may transmit the generated distinct sentence 714 to the electronic device 100.

According to an embodiment of the disclosure, the electronic device 100 may output a message 712 requesting the user to speak the generated distinct sentence 714. The electronic device 100 may display the message 712 requesting the user to speak the distinct sentence 714 on the display 150. However, it is not limited thereto. According to an embodiment of the disclosure, the electronic device 100 may output a sound message requesting the user to speak the distinct sentence 714 through the speaker 140 (refer to FIGS. 2A and 2B).

Figure 7C:
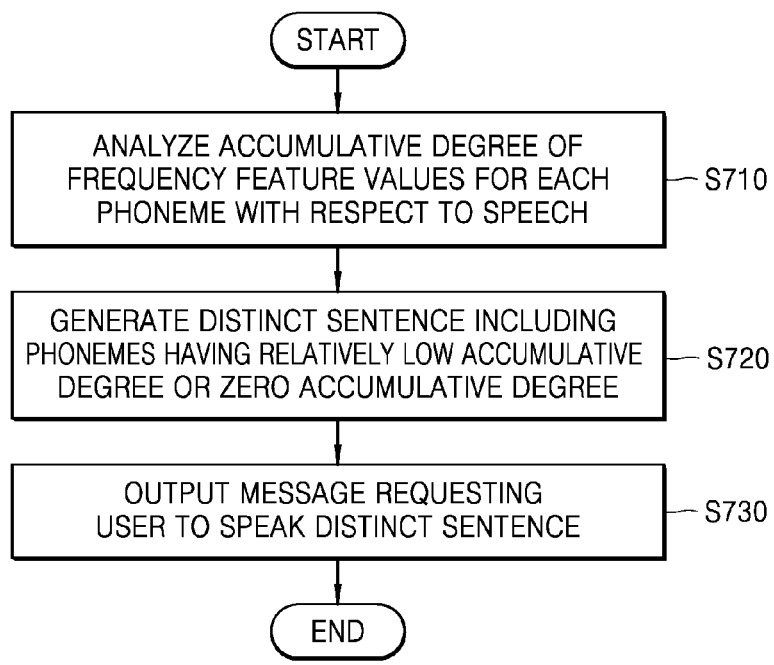
FIG. 7C is a flowchart of a method, performed by an electronic device, of generating a distinct sentence for identifying a speaker on a speaker feature map and outputting a message requesting a speech of the distinct sentence, according to an embodiment of the disclosure.

FIG. 7C is a flowchart of a method, performed by the electronic device 100, of generating a distinct sentence identifying a speaker on a speaker feature map based on a frequency feature value of each phoneme of a speech that is put, and outputting a message requesting utterance of the distinct sentence, according to an embodiment of the disclosure.

Referring to FIG. 7C, in operation S710, the electronic device 100 may analyze a degree of accumulation of the frequency feature value of each phoneme with respect to the speech. According to an embodiment of the disclosure, the electronic device 100 may receive a speech of a non-registered speaker, obtain accumulation time information based on frequency ranges for each phoneme in the speech that is input, and analyze the accumulation time information.

In operation S720, the electronic device 100 may generate the distinct sentence including the phonemes having relatively low degrees of accumulation or not accumulated, based on a result of the analyzing in operation S810.

Operations S710 and S720 may be performed by the electronic device 100, but it is not limited thereto. Operations S710 and S720 may be performed by the server 200.

In operation S730, the electronic device 100 may output a message requesting a user to speak the distinct sentence. According to an embodiment of the disclosure, the electronic device 100 may output a sound message requesting the user to speak the distinct sentence through a speaker. According to an embodiment of the disclosure, the electronic device 100 may output a message requesting the user to speak the distinct sentence on a display. When operations S710 and S720 are performed by the server 200, the electronic device 100 may receive the distinct sentence generated by the server 200 and output the received distinct sentence.

Figure 8:
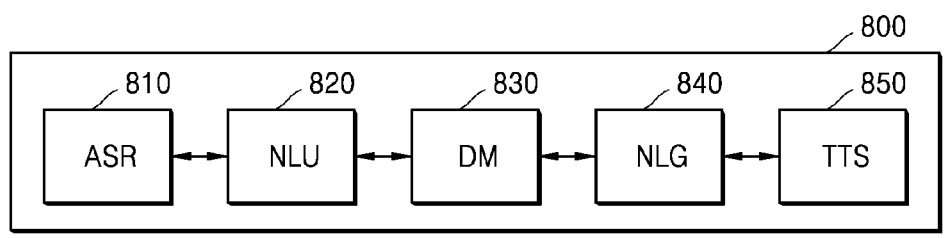
FIG. 8 is a block diagram of components of a virtual assistant module included in an electronic device according to an embodiment of the disclosure.

FIG. 8 is a block diagram of components of a virtual assistant module 800 according to an embodiment of the disclosure. The virtual assistant module 800 may be included in the electronic device 100, but it is not limited thereto. According to an embodiment of the disclosure, the server 200 may include the virtual assistant module 800.

The virtual assistant module 800 may generate a distinct sentence.

Referring to FIG. 8, the virtual assistant module 800 may include a hardware module including an automatic speech recognition (ASR) module 810, a natural language understanding (NLU) module 820, a dialogue management (DM) module 830, a natural language generation (NLG) module 840, and a text-to-speech (TTS) module 850.

The ASR module 810 may recognize a speech input from a user and transform the recognized speech into computer-readable text. The ASR module 810 may analyze degrees of accumulation of frequency feature values of each phoneme with respect to the speech that is input, and detect the phonemes having relatively low degrees of accumulation or not accumulated at all, based on a result of the analyzing. According to an embodiment of the disclosure, the ASR module 810 may analyze the accumulative degrees of the frequency feature values of each phoneme for each speaker.

When the ASR module 810 is included in the server 200, the electronic device 100 may transmit the speech received from the user to the server 200 in an audio file format. In this case, the server 200 may analyze the received speech and transform the received speech into a text form. Via this process, the server 200 may analyze the accumulative degrees of the frequency feature values for each phoneme.

The NLU module 820 may perform natural language processing (NLP), in which, for example, a word is extracted from the text transformed by the ASR module 810 and the extracted word is transformed into a word vector to generate a sentence vector.

The DM module 830 may generate a distinct sentence by receiving an input in a text form, and may generate a response related to the speech. The DM module 830 may generate the distinct sentence based on the accumulative degrees for each phoneme analyzed by the ASR module 810.

The NLG module 840 may generate a distinct sentence in a natural language form.

The TTS module 850 may transform the generated distinct sentence into speech.

The virtual assistant module 800 may output the distinct sentence transformed into speech by the TTS module 850.

Figure 9:
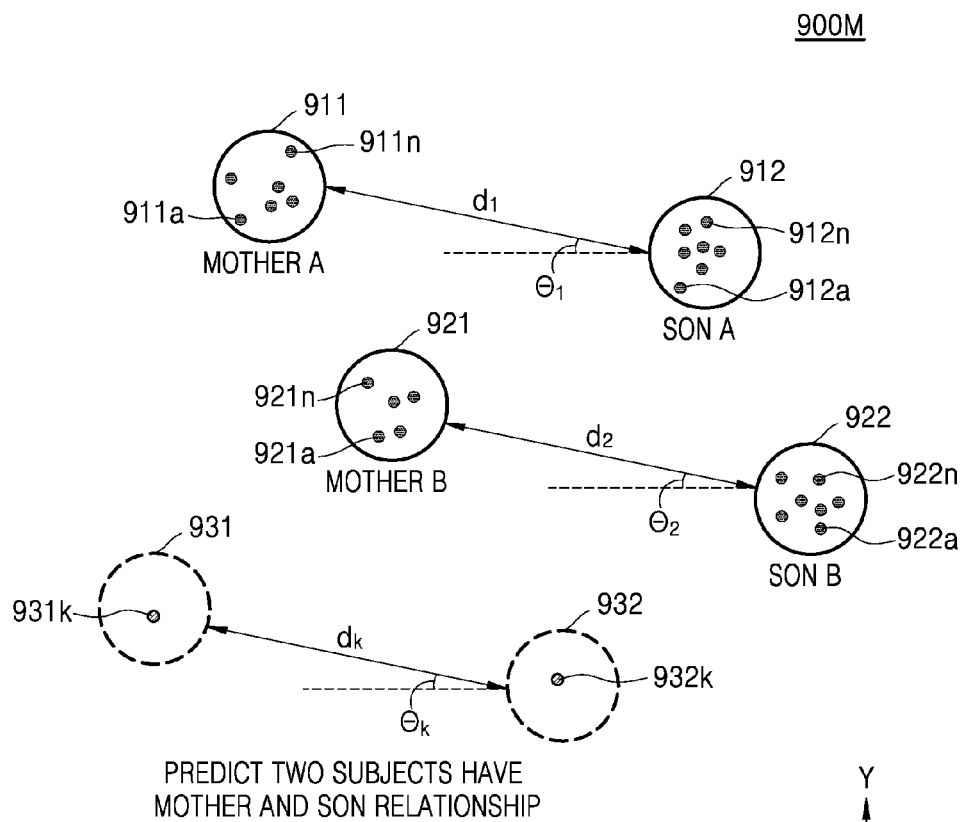
FIG. 9 is a view showing a method, performed by an electronic device, of predicting a relationship among a plurality of speakers based on a positional relationship among a plurality of clusters on a speaker feature map, according to an embodiment of the disclosure.

FIG. 9 is a view showing a method, performed by the electronic device 100, of predicting a relationship among a plurality of speakers based on a positional relationship among a plurality of clusters on a speaker feature map 900M, according to an embodiment of the disclosure. FIG. 9 illustrates speaker feature vectors positioned on the speaker feature map 900M. FIG. 9 illustrates the two-dimensional speaker feature map 900M. However, it is for convenience of explanation. The speaker feature map 900M of the disclosure is not limited thereto, and may be n-dimensional, where n is equal to or greater than 2.

Referring to FIG. 9, a first cluster 911, a second cluster 912, a third cluster 921, and a fourth cluster 922 on the speaker feature map 900M may be clusters, in which user identification information is registered, and which are stored on the storage 130 (refer to FIGS. 2A and 2B), and a fifth cluster 931 and a sixth cluster 932 may be clusters in which user identification information is not registered. For example, the first cluster 911 may be a registered cluster in which identification information of mother A is stored and the second cluster 912 may be a registered cluster in which identification information of son A, who is a son of mother A, is stored. A plurality of speaker feature vectors 911a through 911n extracted from a speech input by mother A may be included in the first cluster 911 and a plurality of speaker feature vectors 912a through 912n extracted from a speech input by son A may be included in the second cluster 912.

The third cluster 921 may be a registered cluster in which identification information of mother B is stored and the fourth cluster 922 may be a registered cluster in which identification information of son B, who is a son of mother B, is stored. A plurality of speaker feature vectors 921a through 921n extracted from a speech input by mother B may be included in the third cluster 921 and a plurality of speaker feature vectors 922a through 922n extracted from a speech input by son B may be included in the fourth cluster 922.

The first cluster 911 and the second cluster 912 may be apart from each other on the speaker feature map 900M by a first distance $d_1$ and may have a positional relationship of forming a first angle $\theta_1$ with respect to an X axis. The third cluster 921 and the fourth cluster 922 may be apart from each other on the speaker feature map 900M by a second distance $d_2$ and may have a positional relationship of forming a second angle $\theta 2$ with respect to the X axis.

The first angle $\theta_1$ and the second angle $\theta_2$ may be substantially the same as each other and the first distance $d_1$ and the second distance $d_2$ may be substantially the same as each other. According to an embodiment of the disclosure, the electronic device 100 may analyze a large volume of voice data by receiving speeches from a plurality of speakers and based on a result of learning, may identify that, in the case of a mother and son relationship, the clusters may have positional relationships of specific distances $d_1$ and $d_2$ and specific angles $\theta_1$ and $\theta_2$. That is, the electronic device 100 may recognize that particular cases, such as the mother and son relationship, may have a tendency with respect to the angles and the distances among the clusters. According to an embodiment of the disclosure, the electronic device 100 may analyze the large volume of voice data and learn distance and directionality information among different clusters and relational matching information of the speakers corresponding to the clusters, and may store the learned matching information.

The electronic device 100 may predict the relationship among the plurality of speakers corresponding to the plurality of clusters based on the distance and directionality information among the plurality of clusters on the speaker feature map 900M.

In the embodiment shown in FIG. 9, the electronic device 100 may receive a speech from speaker 1, extract a fifth feature vector 931k from voice data, and map the extracted fifth feature vector 931k to the fifth cluster 931 on the speaker feature map 900M. Also, the electronic device 100 may receive a speech of speaker 2, extract a sixth feature vector 932k from voice data, and map the extracted sixth feature vector 932k to the sixth cluster 932 on the speaker feature map 900M. The electronic device 100 may obtain information about a distance dk by which the fifth cluster 931 and the sixth cluster 932 are apart from each other and an angle θk formed by the fifth cluster 931 and the sixth cluster 932 with respect to an X axis, on the speaker feature map 900M. Here, the distance dk may be the same as the first distance $d_1$ and the second distance $d_2$ and the angle $\theta k$ may be the same as the first angle $\theta_1$ and the second angle $\theta_2$ in an error range. The electronic device 100 may predict that speaker 1 generating a speech corresponding to the fifth feature vector 931k in the fifth cluster 931 and speaker 2 generating a speech corresponding to the sixth feature vector 932k in the sixth cluster 932 has a mother and son relationship, based on a result of the learning with respect to a relationship information between a positional information including the distance and directionality information among the clusters and speaker's relationship.

Although it is described in FIG. 9 that the electronic device 100 predicts the relationship among the speakers based on the distance and directionality information among the clusters that is learned based on the pre-registered speaker feature vectors and the clusters, embodiments of the disclosure are not limited thereto. According to an embodiment of the disclosure, the server 200 may store the speaker feature map 900M and may predict the relationship among the speakers from a speech that is input, based on the pre-registered speaker feature vectors and the distance and directionality information among the clusters.

Figure 10A:
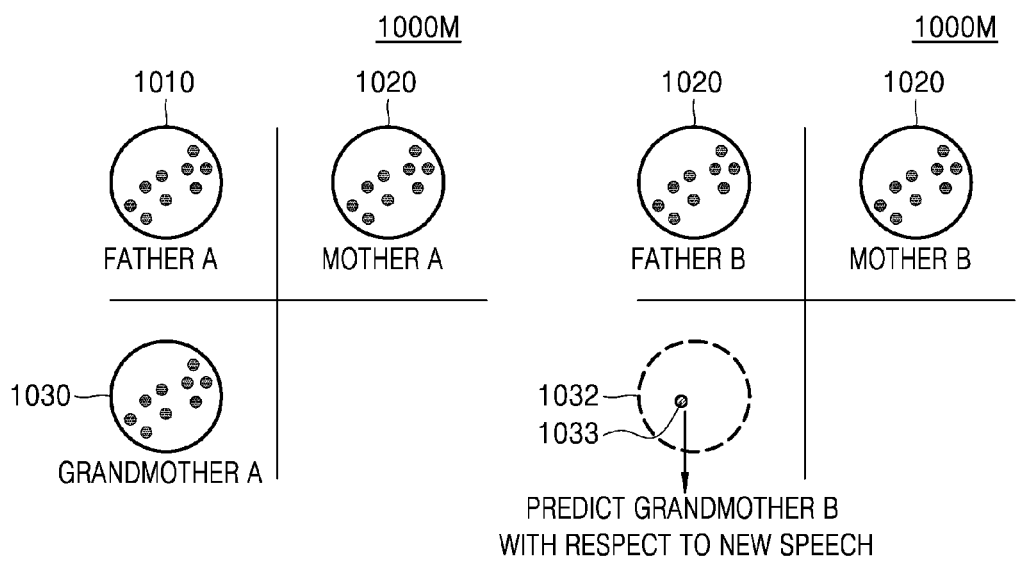
FIG. 10A is a view showing a method, performed by an electronic device, of predicting a relationship among a plurality of speakers based on a positional relationship among a plurality of clusters on a speaker feature map, and providing a personalized service based on the predicted relationship, according to an embodiment of the disclosure.
Figure 10B:
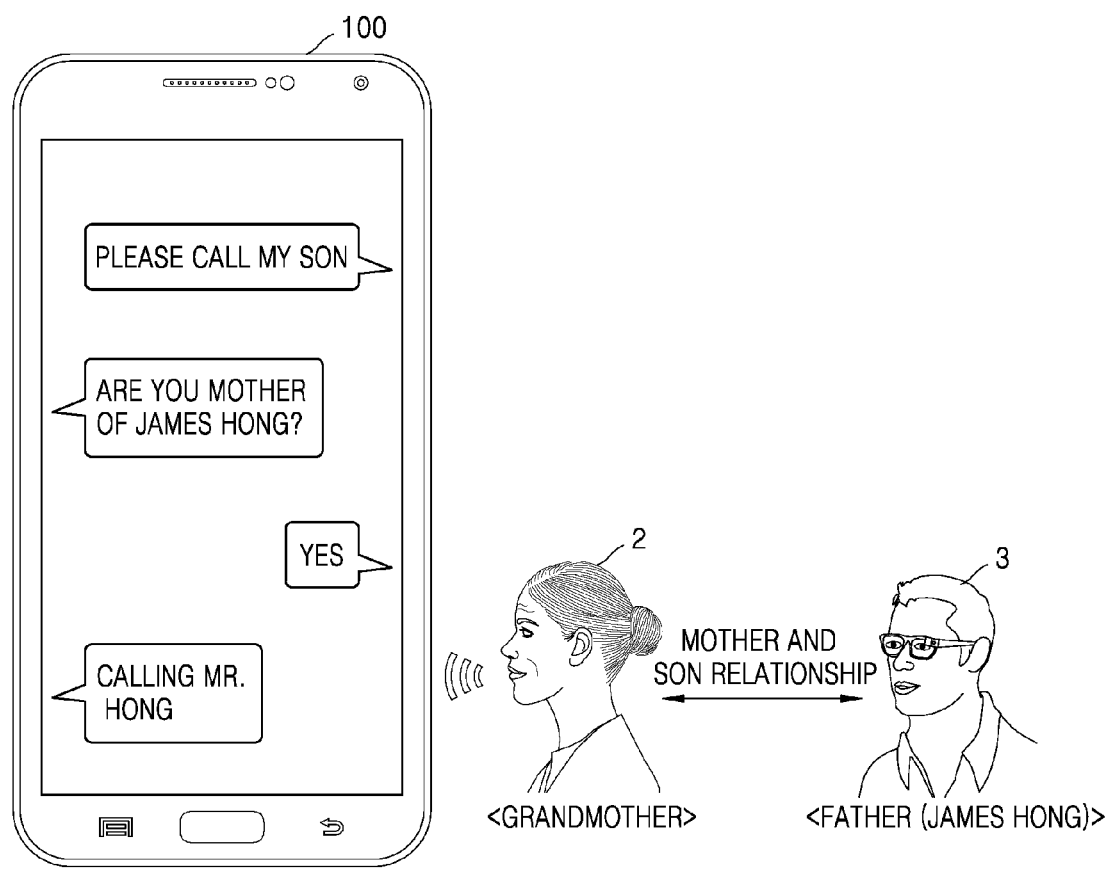
FIG. 10B is a view showing a method, performed by an electronic device, of predicting a relationship among a plurality of speakers based on a positional relationship among a plurality of clusters on a speaker feature map, and providing a personalized service based on the predicted relationship, according to an embodiment of the disclosure.

FIGS. 10A and 10B are views showing a method, performed by an electronic device, of predicting a relationship among a plurality of speakers based on a positional relationship among a plurality of clusters on a speaker feature map, and providing a personalized service based on the predicted relationship, according to various embodiments of the disclosure.

FIG. 10A illustrates speaker feature vectors positioned on a speaker feature map, according to an embodiment of the disclosure. FIG. 10A illustrates a two dimensional speaker feature map, but it is for convenience of explanation. The speaker feature map of the disclosure is not limited to the two-dimensional speaker feature map, and may be an n-dimensional speaker feature map, where n is equal to or greater than 2.

Referring to FIG. 10A, a first cluster 1010, a second cluster 1020, and a third cluster 1030 on a speaker feature map 1000M may be registered clusters, in all of which, user identification information is registered and stored. According to an embodiment of the disclosure, identification information of father A, identification information of mother A, and identification information of grandmother A may be stored and registered in the first cluster 1010, the second cluster 1020, and the third cluster 1030, respectively.

The electronic device 100 may recognize a specific positional relationship among the first cluster 1010, the second cluster 1020, and the third cluster 1030. According to an embodiment of the disclosure, when the electronic device 100 receives speeches from the plurality of speakers, analyzes a large volume of voice data, and based on the analysis, identifies that the clusters have positional relationships of specific distances and specific angles, the electronic device 100 may learn which relationships the speakers have and may store a result of the learning. In an embodiment illustrated in FIG. 10A, father A and grandmother A have a mother and son relationship, and the third cluster 1030 may be positioned vertically below the first cluster 1010 and may have directionality having a specific angle with respect to the first cluster 1010.

The electronic device 100 may extract a speaker feature vector from a speech of a user that is newly input, based on the distance and directionality information among the clusters learned based on the pre-registered speaker feature vectors and the clusters, obtain distance and directionality information between the pre-registered clusters and the newly extracted speaker feature vector, and predict the relationship between the speaker corresponding to the pre-registered cluster and the speaker generating the new speech based on the obtained distance and directionality information. In the embodiment shown in FIG. 10A, the electronic device 100 may receive a speech from a user, extract a fourth feature vector 1033 from voice data, and map the extracted fourth feature vector 1033 to a fourth cluster 1032 on the speaker feature map 1000M. The electronic device 100 may recognize a fourth cluster 1012 positioned at a specific distance and a specific angle with respect to the fourth cluster 1032 in which the fourth feature vector 1033 is positioned. The electronic device 100 may recognize that the distance and the angle at which the fourth cluster 1012 and the fourth cluster 1032 are positioned with respect to each other are the same as the distance and the angle between the first cluster 1010 and the third cluster 1030 pre-registered. The electronic device 100 may predict that a speaker generating a speech corresponding to a fourth feature vector 1013 included in the fourth cluster 1012 and a speaker generating the speech corresponding to the fourth feature vector 1033 included in the fourth cluster 1032 has a mother and son relationship, based on the recognized result. For example, when identification information of father B is registered in the fourth cluster 1012, the electronic device 100 may predict that the fourth cluster 1032 corresponds to a cluster of a speech of grandmother B, who is the mother of father B.

According to an embodiment of the disclosure, the electronic device 100 may recognize the user of the speech newly input based on the predicted relationship between the speakers and provide a personalized service synchronized to the recognized user. With respect to this aspect, referring to FIG. 10B, the electronic device 100 may receive a speech input from grandmother 2, map a cluster by extracting a speaker feature vector from the speech of grandmother 2, and obtain distance and directionality information by comparing a position of the mapped cluster with a position of a pre-registered cluster on a speaker feature map. The electronic device 100 may predict the relationship between grandmother 2 and James Hong 3 as a mother and son relationship based on the obtained angle and directionality information.

According to an embodiment of the disclosure, when the electronic device 100 receives a speech "please call my son" from grandmother 2, the electronic device 100 may recognize grandmother 2 and output a question "are you the mother of James Hong?." When grandmother 2 answers, "yes, it is right," the electronic device 100 may call James Hong 3, while outputting a message "calling Mr. Hong."

For example, when a main user of the electronic device 100 is James Hong 3, and instead of James Hong 3, a son (Cheol Su) of James Hong 3 is stored as "son" in an address list of the electronic device 100, the electronic device 100 according to the related art may not predict the relationship between the speaker and the main user of the electronic device 100, and thus, the electronic device 100 may make a phone call to Cheol Su stored in the address list. However, the electronic device 100 according to the embodiment of the disclosure may recognize that the speaker is grandmother 2 and predict the mother and son relationship between grandmother 2 and James Hong, and thus, in response to the voice command of "please call my son," the electronic device 100 may call James Hong 3, rather than Cheol Su. Accordingly, the electronic device 100 according to the embodiment of the disclosure may provide a personalized service synchronized to each user, and thus, may improve user convenience.

In addition to the example described above, the electronic device 100 may provide various personalized services, such as target advertisements, etc., based on the predicted speakers' relationship. The embodiment of FIGS. 10A and 10B may be performed not only by the electronic device 100, but also by the server 200.

Figure 11:
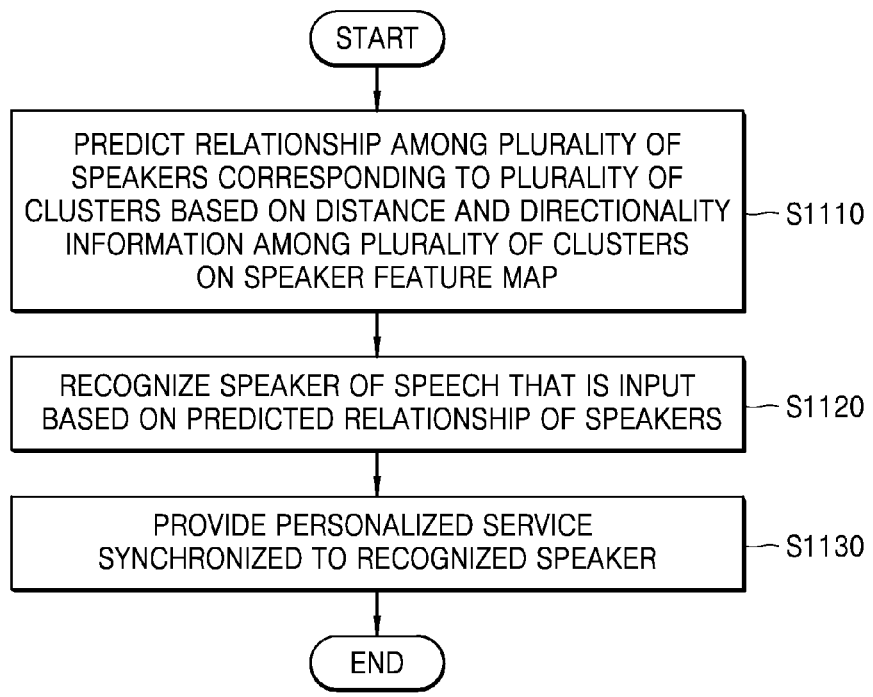
FIG. 11 is a flowchart of a method, performed by an electronic device, of predicting a relationship among a plurality of speakers based on a positional relationship among a plurality of clusters on a speaker feature map, and providing a personalized service based on the predicted relationship, according to an embodiment of the disclosure.

FIG. 11 is a flowchart of a method, performed by the electronic device 100, of predicting a relationship among a plurality of speakers based on a positional relationship among a plurality of clusters on a speaker feature map, and providing a personalized service based on the predicted relationship, according to an embodiment of the disclosure.

Referring to FIG. 11, in operation S1110, the electronic device 100 may predict the relationship among the plurality of speakers corresponding to the plurality of clusters, based on distance and directionality information among the plurality of clusters on the speaker feature map. According to an embodiment of the disclosure, the electronic device 100 may receive speeches from the plurality of speakers, analyze and learn a large volume of voice data, and identify a tendency of a positional relationship having specific distances and specific angles among the clusters, when the speakers have a specific relationship. According to an embodiment of the disclosure, the distance and directionality information among the different clusters and relational matching information of the speakers may be learned and stored by the electronic device 100.

In operation S1120, the electronic device 100 may recognize a speaker of a newly input speech, based on a predicted relationship between the speakers. According to an embodiment of the disclosure, the electronic device 100 may receive a speech of a speaker using the electronic device 100, that is, a user of the electronic device 100, extract a speaker feature vector from the received speech, locate the speaker feature vector on a speaker feature map, and identify a positional relationship between the speaker feature vector and a cluster of other pre-registered speaker feature vectors. According to an embodiment of the disclosure, when it is recognized that a cluster in which the speaker feature vector of the newly input speech of the user is mapped is positioned to be apart from the other pre-registered clusters by a certain distance, and has directionality of a certain angle with respect to the other pre-registered clusters, the electronic device 100 may recognize the speaker based on the distance and directionality information.

In operation S1130, the electronic device 100 may provide a personalized service synchronized to the recognized speaker. According to an embodiment of the disclosure, the electronic device 100 may recognize the speaker of the newly received speech and provide a synchronized service based on a relationship between the speaker and another stored speaker. For example, the electronic device 100 may provide a target advertisement corresponding to the recognized speaker.

Operations S1110 through S1130 illustrated in FIG. 11 may be performed not only by the electronic device 100, but also by the server 200.

Figure 12A:
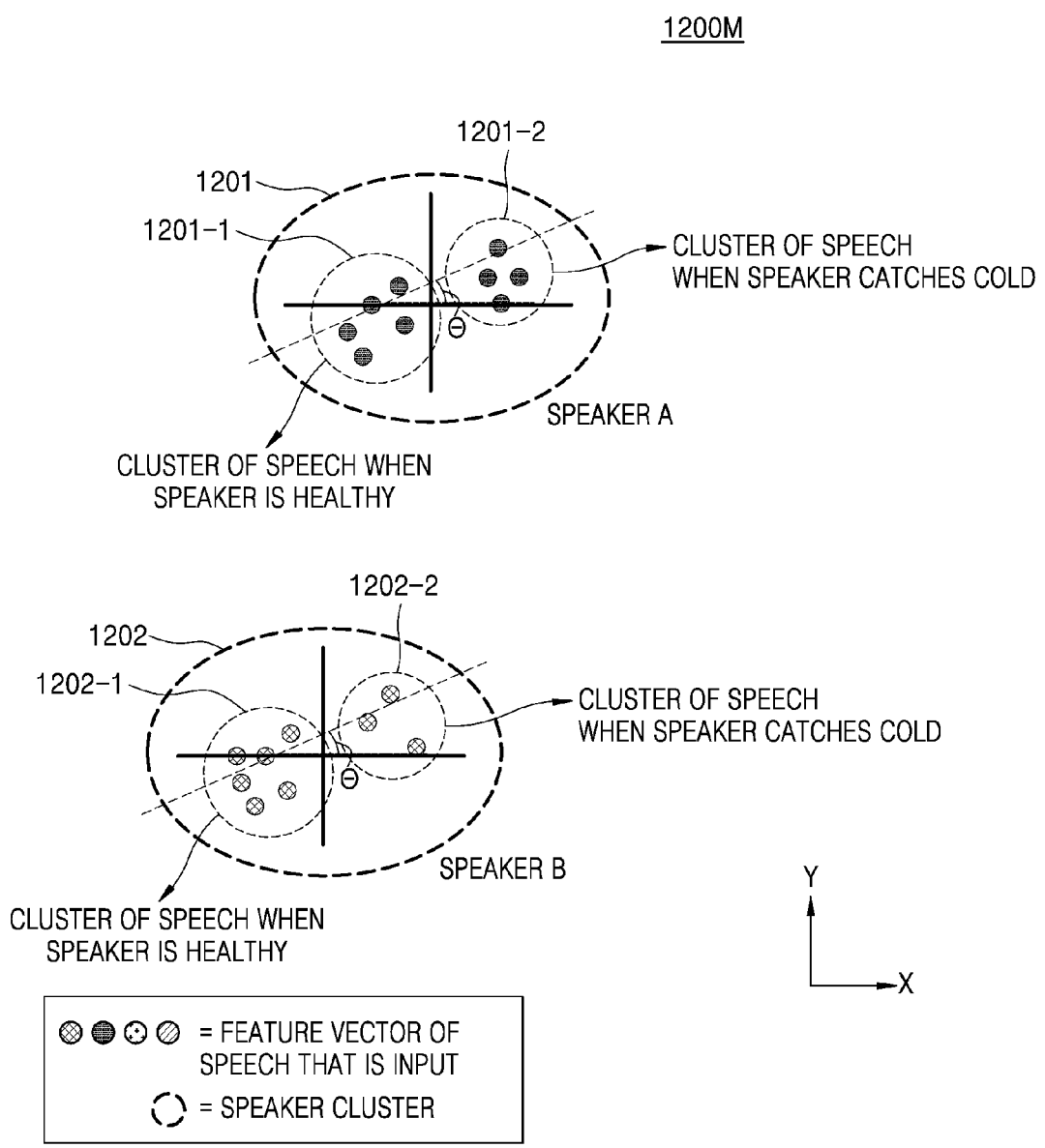
FIG. 12A is a view showing a method, performed by an electronic device, of predicting a user state based on a positional relationship among a plurality of speaker feature vectors on a speaker feature map, according to an embodiment of the disclosure.
Figure 12B:
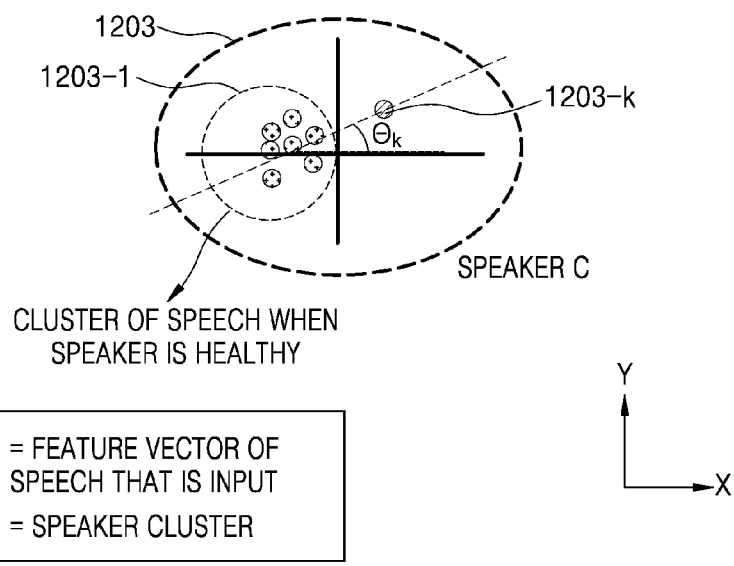
FIG. 12B is a view showing a method, performed by an electronic device, of predicting a user state based on a positional relationship among a plurality of speaker feature vectors on a speaker feature map, according to an embodiment of the disclosure.

FIGS. 12A and 12B are views showing a method, performed by the electronic device 100, of predicting a state of a user, based on a positional relationship among a plurality of speaker feature vectors positioned in a single cluster on a speaker feature map 1200M, according to various embodiments of the disclosure. FIGS. 12A and 12B illustrate the speaker feature vectors positioned on the speaker feature map 1200M, and FIGS. 12A and 12B illustrate the two-dimensional speaker feature map 1200M, but it is for convenience of explanation. The speaker feature map 1200M of the disclosure is not limited to the two-dimensional speaker feature map, and may be an n-dimensional speaker feature map, where n is equal to or greater than 2.

Referring to FIG. 12A, both of a first cluster 1201 and a second cluster 1202 on the speaker feature map 1200M may be registered clusters, in which user identification information is registered and stored. According to an embodiment of the disclosure, the first cluster 1201 may be a cluster of speaker A and the second cluster 1202 may be a cluster of speaker B. The first cluster 1201 may include a first first sub-cluster 1201-1 and a first second sub-cluster 1201-2 and the second cluster 1202 may include a second first sub-cluster 1202-1 and a second second sub-cluster 1202-2.

In the embodiment illustrated in FIG. 12A, all of the plurality of speaker feature vectors included in the first cluster 1201 may be the speaker feature vectors extracted from a speech of speaker A. The plurality of speaker feature vectors included in the first first sub-cluster 1201-1 may be the speaker feature vectors extracted from the speech of speaker A when speaker A is healthy and the plurality of speaker feature vectors included in the first second sub-cluster 1201-2 may be the speaker feature vectors extracted from the speech of speaker A when speaker A catches a cold. The first first sub-cluster 1201-1 and the first second sub-cluster 1201-2 in the first cluster 1201 may be apart from each other by a certain distance and may form a certain angle $\theta$ with respect to an X axis.

Likewise, all of the plurality of speaker feature vectors included in the second cluster 1202 are the speaker feature vectors extracted from a speech of speaker B, wherein the plurality of speaker feature vectors included in the second first sub-cluster 1202-1 are the speaker feature vectors extracted from the speech of speaker B when speaker B is healthy and the plurality of speaker feature vectors included in the second second sub-cluster 1202-2 are the speaker feature vectors extracted from the speech of speaker B when speaker B catches a cold. The second first sub-cluster 1202-1 and the second second sub-cluster 1202-2 in the second cluster 1202 may be apart from each other by a certain distance and may form a certain angle $\theta_2$ with respect to the X axis.

According to an embodiment of the disclosure, the electronic device 100 may receive speeches from a plurality of speakers, analyze and learn a large volume of voice data, form a plurality of sub-clusters by grouping a plurality of speaker feature vectors gathered in a single cluster within a predetermined distance based on a result of the learning, and identify a tendency of connection between a positional relationship among the sub-clusters and information about a state of the speaker. For example, when the plurality of sub-clusters in the single cluster are apart from each other by a certain distance and have directionality of a predetermined angle $\theta$, the electronic device 100 may obtain relevance information that the speaker catches a cold or the speaker is in a bad health state. The electronic device 100 may store the obtained relevance information between the positional relationship among the sub-clusters and the state of the speaker.

Referring to FIG. 12B, the electronic device 100 may receive a new speech of speaker C and extract a speaker feature vector 1203-$k$ from voice data of the received speech. The electronic device 100 may map the extracted speaker feature vector 1203-$k$ to a third cluster 1203. The electronic device 100 may predict a health state of speaker C based on a positional relationship between a third first sub-cluster 1203-1 in the third cluster 1203 and the newly extracted speaker feature vector 1203-k.

In the embodiment illustrated in FIG. 12B, a speaker feature vector extracted from a speech when speaker C is healthy may be positioned in the third first sub-cluster 1203-1 and the speaker feature vector 1203-k extracted from a speech when speaker C catches a cold may be mapped in a position having directionality of an angle k ($\theta_k$) with respect to the X axis, based on the third first sub-cluster 1203-1. The electronic device 100 may compare the angle k ($\theta_k$) with an angle $\theta$ pre-stored with respect to a health state and when the angle k ($\theta_k$) is the same as the angle $\theta$, may predict that speaker C currently catches a cold.

That is, the electronic device 100 may extract the speaker feature vector 1203-k from the newly input speech of speaker C, compare the position of the extracted speaker feature vector 1203-k with positions of the speaker feature vectors in the third first sub-cluster 1203-1 in the third cluster 1203 on the speaker feature map 1200M, wherein the speaker feature vector 1203-k is mapped in the third cluster 1203, recognize directionality, and predict a health state of speaker C based on the recognized directionality.

According to an embodiment of the disclosure, the electronic device 100 may output a message corresponding to the predicted health state of a user, that is, speaker C, from among messages stored in the storage 130 (see FIGS. 2A and 2B). For example, the electronic device 100 may recognize that speaker C has caught a cold, and may output a consolation message, such as "be careful that you don't exacerbate your cold," or provide information about locations of a clinic, a pharmaceutical store, etc. related to cold to speaker C.

The embodiments of FIGS. 12A and 12B may be performed not only by the electronic device 100, but also by the server 200.

Figure 13:
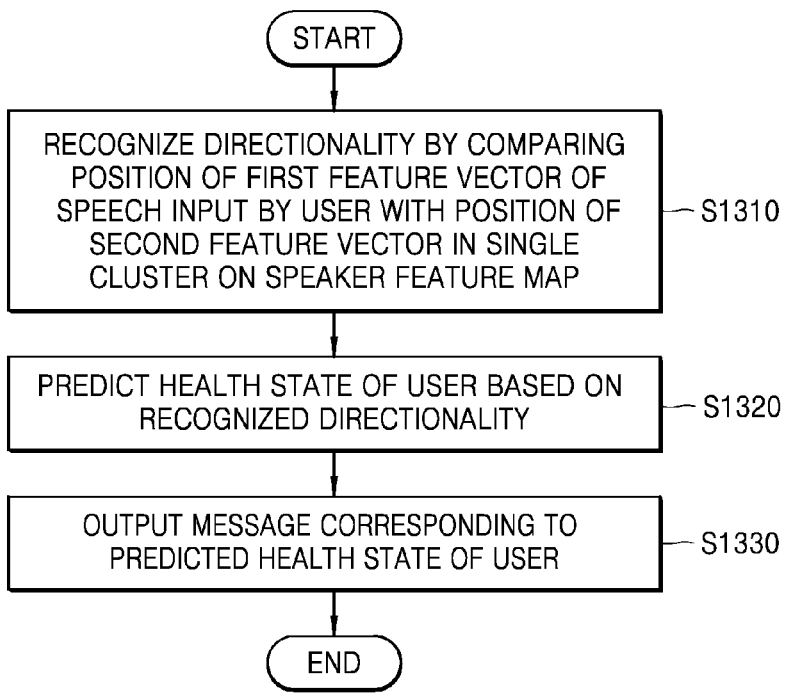
FIG. 13 is a flowchart of a method, performed by an electronic device, of predicting a user state based on a positional relationship among a plurality of speaker feature vectors on a speaker feature map, according to an embodiment of the disclosure.

FIG. 13 is a flowchart of a method, performed by the electronic device 100, of predicting a state of a user based on a positional relationship among a plurality of speaker feature vectors positioned in a single cluster on a speaker feature map, according to an embodiment of the disclosure.

Referring to FIG. 13, in operation S1310, the electronic device 100 may recognize directionality by comparing a position of a first feature vector of a speech received from a user with a position of a second feature vector of a single cluster on the speaker feature map. According to an embodiment of the disclosure, the first feature vector may be mapped in a first cluster and the first cluster may include a plurality of sub-clusters. The plurality of sub-clusters may be formed by speeches of a single speaker, and may be sub-groups of speaker feature vectors extracted from a voice speech changing according to a state of the speaker, such as health or age, etc. According to an embodiment of the disclosure, the electronic device 100 may recognize the directionality by comparing the position of the first feature vector extracted from the speech received from the user with the position of the plurality of sub-clusters in the first cluster.

In operation S1320, the electronic device 100 may predict the health state of the user based on the recognized directionality. The electronic device 100 may store information about the relevance between the directionality among the plurality of sub-clusters in the single cluster, that is, the angles formed among the plurality of sub-clusters, and the speaker state. For example, the electronic device 100 may store the relevance information that when the directionality formed among the plurality of sub-clusters corresponds to a first angle, the speaker catches a cold. The electronic device 100 may predict which health state of the user is indicated by the angle formed by the first feature vector extracted from the speech input in operation S1310 and the sub-cluster, by using the stored relevance information. For example, when the first feature vector, and the sub-cluster which is a sub-group of the speaker feature vectors extracted when the user is healthy, form a first angle, the electronic device 100 may predict that the user currently catches a cold.

In operation S1330, the electronic device 100 may output a message corresponding to the predicted health state of the user. According to an embodiment of the disclosure, when it is predicted that the user currently catches a cold, the electronic device 100 may output a consolation message such as "be careful about catching a cold" through the speaker 140 (see FIGS. 2A and 2B) or output information about positions a clinic, a pharmaceutical store, etc., related to cold though the display 150 (see FIGS. 2A and 2B).

The electronic device 100 according to an embodiment of the disclosure may predict a current health state of a user via a speech of the user and output a related message, thereby providing an emotional consolation to the user, in addition to simple information, allowing the user to feel a human touch of the electronic device 100.

Operations S1310 through S1330 illustrated in FIG. 13 may be performed not only by the electronic device 100, but also by the server 200.

FIG. 14 is a block diagram of components of an electronic device 1000 according to an embodiment of the disclosure. The electronic device 1000 illustrated in FIG. 14 may include the same components as the electronic device 100 described with reference to FIGS. 2A, 2B, 3A to 3D, 4A to 4D, 5, 6A to 6C, 7A to 7C, 8, 9, 10A, 10B, 11, 12A, 12B, and 13. For example, a controller 1300 among the components illustrated in FIG. 14 is the same as the controller 120 illustrated in FIGS. 2A and 2B, a sound outputter 1220 is the same as the speaker 140 illustrated in FIGS. 2A and 2B, and a display 1210 is the same as the display 150 illustrated in FIGS. 2A and 2B. Thus, repeated descriptions will not be given.

The electronic device 1000 illustrated in FIG. 14 may perform all the operations and functions of the electronic device 100 described with reference to FIGS. 2A, 2B, 3A to 3D, 4A to 4D, 5, 6A to 6C, 7A to 7C, 8, 9, 10A, 10B, 11, 12A, 12B, and 13. Thus, hereinafter, the components of the electronic device 1000, which are not described so far will be described.

Referring to FIG. 14, the electronic device 1000 may include the user inputter 1100, an outputter 1200, the controller 1300, the sensor 1400, the communicator 1500, an A/V inputter 1600, and a memory 1700.

The user inputter 1100 may denote a device used by a user to input data to control the electronic device 1000. For example, the user inputter 1100 may include a key pad, a dome switch, a touch pad (a touch capacitance method, a pressure resistive method, an infrared detection method, a surface ultrasonic conductive method, an integral tension measuring method, a piezo effect method, etc.), a jog wheel, a jog switch, etc., but it is not limited thereto. The user inputter 1100 may receive a user input required for generating communication information to be provided to the user.

The outputter 1200 may output an audio signal, a video signal, or a vibration signal and may include the display 1210, the sound outputter 1220, and a vibration motor 1230.

The vibration motor 1230 may output a vibration signal. For example, the vibration motor 1230 may output a vibration signal corresponding to an output of audio data or video data (for example, a call signal reception sound, a message reception sound, etc.).

The sensor 1400 may sense a state of the electronic device 1000 or a state around the electronic device 1000 and transmit the sensed information to the controller 1300.

The sensor 1400 may include at least one of a magnetic sensor 1410, an acceleration sensor 1420, a temperature/humidity sensor 1430, an infrared sensor 1440, a gyroscope sensor 1450, a position sensor (for example, a global positioning sensor (GPS)) 1460, an air pressure sensor 1470, a proximity sensor 1480, or a red-green-blue (RGB) sensor (a luminance sensor) 1490, but it is not limited thereto. A function of each sensor may be intuitively inferred by one of ordinary skill in the art based on its name, and thus, its detailed description will not be given.

The communicator 1500 may include components configured to enable communication with other devices. For example, the communicator 1500 may include a short-range wireless communicator 1510, a mobile communicator 1520, and a broadcasting receiver 1530.

The short-range wireless communicator 151 may include a Bluetooth communicator, a BLE communicator, an NFC, a wireless LAN (WLAN) (or Wi-Fi) communicator, a Zigbee communicator, an infrared data association (IrDA) communicator, a WFD communicator, an ultrawide band (UWB) communicator, an Ant+ communicator, etc., but is not limited thereto.

The mobile communicator 1520 may transceive wireless signals with at least one of a base station, an external terminal, or a server, via a mobile communication network. Here, the wireless signal may include a sound call signal, a video-telephony call signal, or various type of data based on transceiving of text/multimedia message.

The broadcasting receiver 1530 may receive a broadcasting signal and/or broadcasting-related information from the outside via broadcasting channels. The broadcasting channels may include satellite channels and ground wave channels. According to an embodiment of the disclosure, the electronic device 1000 may not include the broadcasting receiver 1530.

Also, the communicator 1500 may transmit and receive information required to generate communication information to be provided to a first user to and from a second communicating electronic device 3000, other devices, and servers.

The A/V inputter 1600 may be configured to input an audio signal or a video signal and may include a camera 1610 and a microphone 1620. The camera 1610 may obtain an image frame, such as a still image or a video, via an image sensor, in a video-telephony mode or a capturing mode. The image captured by the image sensor may be processed by the controller 1300 or an additional image processor (not shown).

The image frame processed by the camera 1610 may be stored in the memory 1700 or may be transmitted to the outside via the communicator 1500. The camera 1610 may include two cameras according to an embodiment of a terminal.

The microphone 1620 may receive an external sound signal and process the received external sound signal into electrical voice data. For example, the microphone 1620 may receive a sound signal from an external device or a speaker. The microphone 1620 may use various noise removal algorithms for removing noise generated in the process of receiving external sound signals.

The memory 1700 may store programs for a processing and controlling operation of the controller 1300 and may store data input to the electronic device 1000 or output from the electronic device 1000.

The memory 1700 may include at least one type of storage medium from among a flash memory type memory, a hard disk type memory, a multimedia card micro type memory, a card type memory (for example, an SD or XD memory), RAM, SRAM, ROM, EEPROM, PROM, magnetic memory, magnetic disks, and optical disks.

The programs stored in the memory 1700 may be classified into a plurality of modules according to their functions. For example, the programs may be classified into a UI module 1710, a touch screen module 1720, a notification module 1730, etc.

The UI module 1710 may provide a specialized UI or graphical user interface (GUI), etc., synchronized to the electronic device 1000, according to applications. The touch screen module 1720 may sense a touch gesture of a user on a touch screen and may transmit information about the touch gesture to the controller 1300. The touch screen module 1720 according to one or more embodiments of the disclosure may recognize and analyze a touch code. The touch screen module 1720 may be formed as additional hardware including a controller.

The notification module 1730 may generate a signal for notifying the occurrence of events of the electronic device 1000. Example events occurring in the electronic device 1000 may include call signal reception, message reception, key signal input, schedule notification, etc. The notification module 1730 may output a notification signal in a video signal form via the display 1210, in an audio signal form via the sound outputter 1220, and in a vibration signal form via the vibration motor 1230.

The electronic devices 10, 100, and 100 according to the disclosure may be realized as hardware components, software components, and/or the combination of hardware components and software components. For example, the electronic devices 10, 100, and 1000 according to the embodiments of the disclosure may be realized by using a processor, an arithmetic logic unit (ALU), application specific integrated circuits (ASICs), digital signal processors (DSPs), digital signal processing devices (DSPDs), programmable logic devices (PLDs), microcomputers, microprocessors, or one or more general-purpose computers or special-purpose computers, such as a device capable of executing and responding to instructions.

The software components may include a computer program, a code, an instruction, or a combination of one or more thereof, and may configure a processing device to operate as required or separately or collectively command the processing device.

The software components may be realized as a computer program including instructions stored in computer-readable storage media. The computer-readable storage media may include, for example, magnetic storage media (for example, ROM, RAM, floppy disks, hard disks, etc.) and optical reading media (for example, compact disc ROM (CD-ROM), digital versatile disc (DVD), etc.). The computer-readable recording media may be distributed in computer systems connected in a network and may store and execute computer-readable codes in a distributed fashion. The media may be computer-readable, may be stored in a memory, and executed by a processor.

The computer may be a device configured to call instructions stored in the storage media, and in response to the called instructions, to perform an operation according to the embodiments of the disclosure, and may include the electronic devices 10, 100, and 1000 according to the embodiments of the disclosure.

The computer-readable storage media may be provided as non-transitory storage media. Here, the term "non-transitory" only denotes that the storage media do not include signals and are tangible, and the term does not distinguish between semi-permanent storage and temporary storage of data in the storage media.

Also, the electronic devices 10, 100, and 1000 or the methods according to the embodiments of the disclosure may be included in a computer program product. The computer program product is a product purchasable between a seller and a purchaser.

The computer program product may include a software program and a computer-readable storage medium in which the software program is stored. For example, the computer program product may include a software program-type product (for example, a downloadable application) electronically distributed by a manufacturer of the electronic devices 10, 100, and 1000 or electronic markets (for example, Google Play™ store, App Store, etc.). For electronic distribution, at least a portion of the software program may be stored in storage media or temporarily generated. In this case, the storage media may be a server of the manufacturer, a server of the electronic market, or a storage medium of a broadcasting server temporarily storing the software program.

The computer program product may include a storage medium of a server or a storage medium of a terminal in a system including the server and the terminal (for example, an ultrasonic diagnosis apparatus). Alternatively, when there is a third device (for example, a smartphone) connected with the server or the terminal for communication, the computer program product may include a storage medium of the third device. Alternatively, the computer program product may include a software program transmitted to the terminal or the third device from the server or to the terminal from the third device.

In this case, one of the server, the terminal, and the third device may execute the method according to the embodiments of the disclosure by executing the computer program product. Alternatively, at least two of the server, the terminal, and the third device may execute the method according to the embodiments of the disclosure in a distributed fashion by executing the computer program product.

For example, the server (for example, a cloud server or an AI server) may execute the computer program product stored in the server and control the terminal connected with the server for communication to perform the method according to the embodiments of the disclosure.

As another example, the third device may execute the computer program product and control the terminal connected to the third device for communication to perform the method according to the embodiments of the disclosure.

When the third device executes the computer program product, the third device may download a computer program product from the server and execute the downloaded computer program product. Alternatively, the third device may execute the computer program product provided in a free-loaded state and perform the method according to the embodiments of the disclosure.

In addition, although the embodiments of the disclosure have been illustrated and described above, the disclosure is not limited to the above-described specific embodiments. Various modified embodiments may be made by one of ordinary skill in the art without departing from the scope of the disclosure as claimed in the claims, and these modifications should not be individually understood from the technical spirit or the prospect of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents. For example, the described techniques may be performed in a different order than the described method, and/or components of the described electronic device, structure, circuit, etc. may be combined or integrated in a different form than the described method, or may be replaced or substituted by other components or equivalents to achieve appropriate results.

What is claimed is:

1. A method of processing voice data of a speech, the method comprising:
   extracting a speaker feature vector from the voice data of the speech received from a speaker based on a frequency feature value of each of a plurality of frequency ranges for each phoneme of the voice data;
   generating a speaker feature map by positioning the extracted speaker feature vector at a specific position on a multi-dimensional vector space;
   forming a plurality of clusters indicating features of voices of a plurality of speakers by grouping at least one speaker feature vector positioned on the speaker feature map; and
   classifying the plurality of speakers according to the plurality of clusters,
   wherein the extracting the speaker feature vector comprises:
   extracting the frequency feature values for which a difference between frequency feature values of the plurality of speakers in the same phoneme and the same frequency range exceeds a predetermined critical value, and
   transforming the extracted frequency feature values into the speaker feature vector.

2. The method of claim 1, wherein the extracting of the speaker feature vector comprises:
   training a deep neural network (DNN) model by applying the speaker feature vector extracted from the voice data to the DNN model as an input and applying a feature value with respect to an index of the speaker as an output; and
   extracting the speaker feature vector by using a result of the training.

3. The method of claim 1, further comprising:
   receiving, from a user, speech inputting identification information;
   extracting the speaker feature vector from the voice data of the speech;
   mapping the extracted speaker feature vector to a cluster from among the plurality of clusters on the speaker feature map; and
   registering the identification information of the user to the cluster from among the plurality of clusters.

4. The method of claim 3, further comprising:
   generating a distinct sentence including phonemes, for which a difference in the frequency feature value between a plurality of speakers is equal to or greater than a predetermined critical value, and
   before receiving the identification information from the user, requesting the user to speak the distinct sentence for registering the identification information of the user.

5. The method of claim 1, wherein the forming of the plurality of clusters comprises forming the plurality of clusters by grouping the at least one speaker feature vector positioned on the speaker feature map within a predetermined distance from at least one other.

6. The method of claim 1, wherein the forming of the plurality of clusters comprises:
training a deep neural network (DNN) model by applying the speaker feature vector to the DNN model as an input value and applying a similarity index among the plurality of speakers as an output value; and
forming the plurality of clusters by grouping at least one similar speaker feature vector based on the training.

7. The method of claim 1, further comprising predicting a relationship among the plurality of speakers corresponding to the plurality of clusters based on distance and directionality information among the plurality of clusters on the speaker feature map.

8. The method of claim 1, further comprising predicting a state of a speaker of the speech based on a relative positional relationship among a plurality of speaker feature vectors in one cluster of the plurality of clusters.

9. The method of claim 8, wherein the predicting of the state of the speaker comprises:
recognizing directionality by comparing a position of a first feature vector of the speech received from a user with a position of a second feature vector in the cluster on the speaker feature map, wherein the first feature vector is mapped to the cluster; and
predicting a health state of the user based on the recognized directionality.

10. The method of claim 9, further comprising outputting a message corresponding to the predicted health state of the user from among pre-stored messages.

11. An electronic device for processing voice data of a speech, the electronic device comprising:
a speech inputter receiving the speech from a speaker;
at least one processor configured to:
extract a speaker feature vector from the voice data of the speech received by the speech inputter based on a frequency feature value of each of a plurality of frequency ranges for each phoneme of the voice data,
generate a speaker feature map by positioning the extracted speaker feature vector at a specific position on a multi-dimensional vector space,
form a plurality of clusters indicating features of voices of a plurality of speakers by grouping at least one speaker feature vector positioned on the speaker feature map, and
classify the plurality of speakers according to the plurality of formed clusters; and
a storage storing the speaker feature map,
wherein the at least one processor is further configured to:
extract the frequency feature values for which a difference between frequency feature values of the plurality of speakers in the same phoneme and the same frequency range exceeds a predetermined critical value, and
transform the extracted frequency feature values into the speaker feature vector.

12. The electronic device of claim 11, wherein the at least one processor is further configured to train a deep neural network (DNN) model by applying the speaker feature vector extracted from the voice data to the DNN model as an input and applying a feature value with respect to an index of a speaker as an output and extract the speaker feature vector by using a result of the training.

13. The electronic device of claim 11,
wherein the speech inputter receives, from a user, speech inputting identification information, and
wherein the at least one processor is further configured to:
extract the speaker feature vector from the voice data of the speech,
map the extracted speaker feature vector to a cluster from among the plurality of clusters on the speaker feature map, and
register the identification information of the user to the cluster from among the plurality of clusters.

14. The electronic device of claim 13, further comprising:
a speaker outputting a voice message,
wherein the at least one processor is further configured to:
generate a distinct sentence including phonemes, for which a difference in the frequency feature value between a plurality of speakers is equal to or greater than a predetermined critical value, and
control the speaker to output the voice message requesting the user to speak a distinct sentence for registering the identification information of the user.

15. The electronic device of claim 11, wherein the at least one processor is further configured to form the plurality of clusters by grouping the at least one speaker feature vector positioned on the speaker feature map within a predetermined distance from at least one other.

16. The electronic device of claim 11, wherein the at least one processor is further configured to:
train a deep neural network (DNN) model by applying the speaker feature vector to the DNN model as an input value and applying a similarity index among the plurality of speakers as an output value, and
form the plurality of clusters by grouping at least one similar speaker feature vector based on the training.

17. The electronic device of claim 11, wherein the at least one processor is further configured to predict a relationship among the plurality of speakers corresponding to the plurality of clusters based on distance and directionality information among the plurality of clusters on the speaker feature map.

18. The electronic device of claim 11, wherein the at least one processor is further configured to:
recognize directionality by comparing a position of a first feature vector of the speech received by the speech inputter with a position of a second feature vector in a cluster on the speaker feature map, the first feature vector being mapped to the cluster, and
predict a health state of a user based on the recognized directionality.

19. The electronic device of claim 18, further comprising:
a speaker outputting a voice message,
wherein the at least one processor is further configured to control the speaker to output a message corresponding to the predicted health state of the user from among pre-stored messages.

20. A computer program product comprising a non-transitory computer-readable recording medium comprising instructions to:
control an electronic device to receive a speech from a speaker;
extract a speaker feature vector from voice data of the speech based on a frequency feature value of each of a plurality of frequency ranges for each phoneme of the voice data;
generate a speaker feature map by positioning the extracted speaker feature vector at a specific position on a multi-dimensional vector space;

form a plurality of clusters indicating features of voices of a plurality of speakers by grouping at least one speaker feature vector positioned on the speaker feature map; and classify the plurality of speakers according to the plurality of clusters, wherein the instructions further comprises:

extract the frequency feature values for which a difference between frequency feature values of the plurality of speakers in the same phoneme and the same frequency range exceeds a predetermined critical value, and transform the extracted frequency feature values into the speaker feature vector.

* * * * *